(12) United States Patent
Macaisa et al.

(10) Patent No.: US 11,276,105 B2
(45) Date of Patent: Mar. 15, 2022

(54) GIFT REGISTRY

(71) Applicant: TRANSFORM SR BRANDS LLC, Hoffman Estates, IL (US)

(72) Inventors: Marie Basa Macaisa, Chicago, IL (US); Katherine Susan Schneider, Downers Grove, IL (US); Varun Reddy Agasti, Schaumburg, IL (US); Sundaresan Chandrasekaran, Schaumburg, IL (US); Jose David Zayas, Lake in the Hills, IL (US); Gregory Drogaline, Arlington Heights, IL (US); Leena Munjal, Algonquin, IL (US)

(73) Assignee: Transform SR Brands LLC, Hoffman Estates, IL (US)

( * ) Notice: Subject to any disclaimer, the term of this patent is extended or adjusted under 35 U.S.C. 154(b) by 126 days.

(21) Appl. No.: 16/674,248

(22) Filed: Nov. 5, 2019

(65) Prior Publication Data
US 2020/0143449 A1   May 7, 2020

Related U.S. Application Data

(63) Continuation of application No. 13/668,256, filed on Nov. 3, 2012, now Pat. No. 10,467,680.

(60) Provisional application No. 61/668,774, filed on Jul. 6, 2012, provisional application No. 61/555,595, filed on Nov. 4, 2011.

(51) Int. Cl.
*G06Q 30/00* (2012.01)
*G06Q 30/06* (2012.01)
*G06Q 50/00* (2012.01)

(52) U.S. Cl.
CPC ......... *G06Q 30/0633* (2013.01); *G06Q 50/01* (2013.01)

(58) Field of Classification Search
CPC .............. G06Q 30/00; G06Q 30/0601; G06Q 30/0613; G06Q 30/0619; G06Q 30/0633; G06Q 30/0639
See application file for complete search history.

(56) References Cited

U.S. PATENT DOCUMENTS

| | | | |
|---|---|---|---|
| 7,603,292 B1* | 10/2009 | Bragg | G06Q 30/0609 705/26.35 |
| 2002/0104090 A1* | 8/2002 | Stettner | H04N 21/4223 725/60 |
| 2003/0043070 A1* | 3/2003 | Soliman | H04L 67/18 342/357.48 |

(Continued)

OTHER PUBLICATIONS

Rathore, Shailendra, et al. "Social network security: Issues, challenges, threats, and solutions." Information sciences 421 (2017): 43-69. (Year: 2017).*

(Continued)

*Primary Examiner* — Christopher B Seibert
(74) *Attorney, Agent, or Firm* — McAndrews, Held & Malloy, Ltd.

(57) ABSTRACT

A social gift registry provides tools to aid those planning for major milestones in life to engage a network of friends, family, and others in communicating information about the life event, helping to identify and track gifts for the celebrants, and enabling the management of the activities involved in the celebration.

20 Claims, 27 Drawing Sheets

(56) References Cited

U.S. PATENT DOCUMENTS

| | | | |
|---|---|---|---|
| 2004/0205005 A1* | 10/2004 | Matsunaga | G06Q 10/087 705/26.2 |
| 2005/0091120 A1* | 4/2005 | Auletta | G06Q 30/02 705/7.36 |
| 2006/0161484 A1* | 7/2006 | Pandhe | G06Q 30/06 705/26.81 |
| 2008/0172307 A1* | 7/2008 | Hurowitz | G06Q 30/08 705/26.3 |
| 2008/0189189 A1* | 8/2008 | Morgenstern | G06Q 30/0641 705/12 |
| 2009/0138439 A1* | 5/2009 | Yeung | G06F 16/9537 |
| 2010/0100455 A1 | 4/2010 | Song | |
| 2010/0280913 A1* | 11/2010 | O'Sullivan | G06Q 30/02 |
| 2011/0010340 A1* | 1/2011 | Hung | H04L 51/22 707/623 |
| 2011/0099618 A1* | 4/2011 | Mutt | H04L 9/3263 726/8 |
| 2011/0213675 A1 | 9/2011 | Friedman | |
| 2011/0258125 A1* | 10/2011 | Iyer | G06Q 10/103 705/301 |
| 2012/0310772 A1* | 12/2012 | Morlock | G01C 21/32 705/26.8 |
| 2013/0211954 A1* | 8/2013 | Linden | G06Q 30/0621 705/26.8 |

OTHER PUBLICATIONS

PCT, International Search Report and the Written Opinion of the International Searching Authority, or the Declaration, in International application No. PCT/US2012/63470, dated Jan. 17, 2013. (6 pages).

Rathore, Shailenda et al., "Social network security: Issues challenges, threats, and solutions." Information sciences 421 (2011): 43-69. (Year: 2011).

* cited by examiner

MANAGE REGISTRY: AFTER THE WEDDING

SEARS *wedding* REGISTRY

REGISTRY OVERVIEW | ADD PRODUCTS | VIEW REGISTRY | PLANNING TOOLS | REGISTRY SETTINGS | ADVICE & HELP

REGISTRY OVERVIEW ⓘ

100 WANTED − 85 PURCHASED = 15 LEFT TO BUY

- EARN 10% BACK IN BONUS POINTS ON EVERYTHING LEFT!
- JOIN SHOP YOUR WAY REWARDS
- USE WEDDING MONEY TO BUY THAT TV YOU WANTED
- BUY THE LAST TWO DINNERWARE ITEMS
- SEE ALL OF THE ITEMS LEFT IN YOUR REGISTRY

RECENT ACTIVITY ⓘ

<PRODUCT NAME> WAS PURCHASED FROM YOUR REGISTRY.

SH🛒P YOUR WAY REWARDS — DIDN'T GET EVERYTHING YOU WANTED?
SHOP NOW TO EARN 10% BONUS POINTS ON EVERYTHING LEFT IN YOUR REGISTRY.

PLANNING YOUR HOUSEWARMING?
LEARN HOW TO MOVE YOUR UNPURCHASED ITEMS TO A NEW HOUSEWARMING REGISTRY.

UPDATE REGISTRY PURCHASES
DID YOU RECEIVE A GIFT FROM YOUR REGISTRY THAT LOOKS LIKE IT'S STILL NEEDED?
UPDATE YOUR REGISTRY TO RECORD THE PURCHASE

21 DAYS OF MARITAL BLISS

SUGGESTED ACTIVITIES
- REVIEW ITEMS YOU RECEIVED
- CONNECT WITH OTHER NEWLYWEDS
- TELL US ABOUT YOUR REGISTRY EXPERIENCE (YOU WOULD WIN A PRIZE)

COMPLETION PERCENTAGES
COOKWARE
DINNERWARE
BEDDING
BATH
TOOLS
ELECTRONICS
0   20   40   60   80   100

REGISTRY HELPERS | MANAGE
COLLABORATOR NAME
[WEDDING ROLE]
LAST ACTIVITY 1/15/2012
VIEW PAGE
COLLABORATOR NAME
[WEDDING ROLE]
LAST ACTIVITY 1/15/2012
VIEW PAGE
COLLABORATOR NAME
[WEDDING ROLE]
LAST ACTIVITY 1/15/2012
VIEW PAGE

MOST POPULAR PIECES
PRODUCT NAME
$00.00

---

USER LASTNAME
PROFILE | INFO | SETTINGS

SH🛒P YOUR WAY REWARDS
AVAILABLE POINTS: 584
THAT'S WORTH: $0.58
VIP STATUS: ON YOUR WAY TO SILVER
BONUS     *      *
MEMBER    ****   ****
$2500 AWAY FROM THE NEXT LEVEL
2012 QUALIFIED SPENDING: $0

VIEW ACCOUNT HISTORY
☐ RECENT ACTIVITY
☐ CATALOGS
☐ CONTENT ▲
☐ BADGES
☐ INTERESTS
☐ BRANDS
☐ CLIQUES
☐ STORES
☐ FRIENDS

GIFT REGISTRY

EARN & REDEEM POINTS
☐ ABOUT
☐ EARN POINTS
☐ REDEEM POINTS
☐ BONUS OFFERS
☐ VIP LEVELS

YOUR RECENT STATS
YOU HAD 2 NEW FOLLOWERS IN THE PAST 30 DAYS

SHARED BROWSING
SHOP WITH ME? 📶 NOT SHARING

GIFT REGISTRY

CROSS-REFERENCE TO RELATED APPLICATIONS

The present application is a continuation of U.S. application Ser. No. 13/668,256, filed Nov. 3, 2012, which makes reference to, claims benefit from, and claims priority to U.S. Application No. 61/668,774, filed Jul. 6, 2012, and U.S. Application No. 61/555,595, filed Nov. 4, 2011. In addition, the present application hereby references U.S. application Ser. No. 13/284,162, filed Oct. 28, 2011. The above-identified applications are hereby incorporated by reference herein in their entirety.

FIELD OF THE INVENTION

Certain embodiments of the invention relate to systems and methods that support gift registries. More specifically, certain embodiments of the present invention relate to gift registries that include social components involving not only the gift registry registrant, but also others, including family and friends that engage in planning and discussion supporting the registrant, and that enable interest-based social networks that aid in the formation of relationships based on similar domains of user interest.

BACKGROUND OF THE INVENTION

Gift Registries have existed in various forms for nearly 90 years, and have normally been maintained as a physical, hard-copy record of the items selected by one celebrating a life event as something desired by the celebrant. More recently, as in the last twenty years or so, online gift registries have enabled wider, electronic access to the information of the traditional gift registry, but have still been primarily for maintaining a list of items selected by an individual or couple as things desired as a gift during the celebration of a particular life event. In either form, the traditional gift registry process focuses primarily on the registrant as the central figure, and others use the gift registry as a resource in making choices of gifts for the celebrant.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method that enables operation of a gift registry supporting enhanced social interaction among the registrant, co-registrant, and collaborators, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 15 shows an illustration of an exemplary after-event web page, in accordance with a representative embodiment of the present invention.

FIG. 16 is an illustration of a gift registry web page showing the display of an article containing news or information automatically selected by the gift registry system as being related to items/products from the gift registry of a registrant, or related to the life event of the registrant, in accordance with a representative embodiment of the present invention.

FIG. 18 illustrates an exemplary gift registry management web page that provides an option for adding registry items, an option for viewing the items in the gift registry, an option for modifying gift registry settings, an option for planning for the life event, and an option for requesting advice and help, in accordance with a representative embodiment of the present invention.

FIG. 20 shows an example starter registry web page, in accordance with a representative embodiment of the present invention.

FIG. 21 illustrates an exemplary item selection web page that enables use of a picture drag-and-drop technique for use by a registrant/co-registrant in selecting items for assembling their own gift registry, in accordance with a representative embodiment of the present invention.

FIG. 22 shows an exemplary item selection web page that may correspond to the item selection web page of FIG. 21, following addition of an item/product to the "My Registry" area, in accordance with a representative embodiment of the present invention.

FIG. 23 is an illustration of an exemplary item selection web page 2300 that may, for example, correspond to the item selection web page 2200 of FIG. 22, in which four of the six items/products available for selection are accompanied by a "get advice" option 2392, in accordance with a representative embodiment of the present invention.

DETAILED DESCRIPTION OF THE INVENTION

Figure 1:
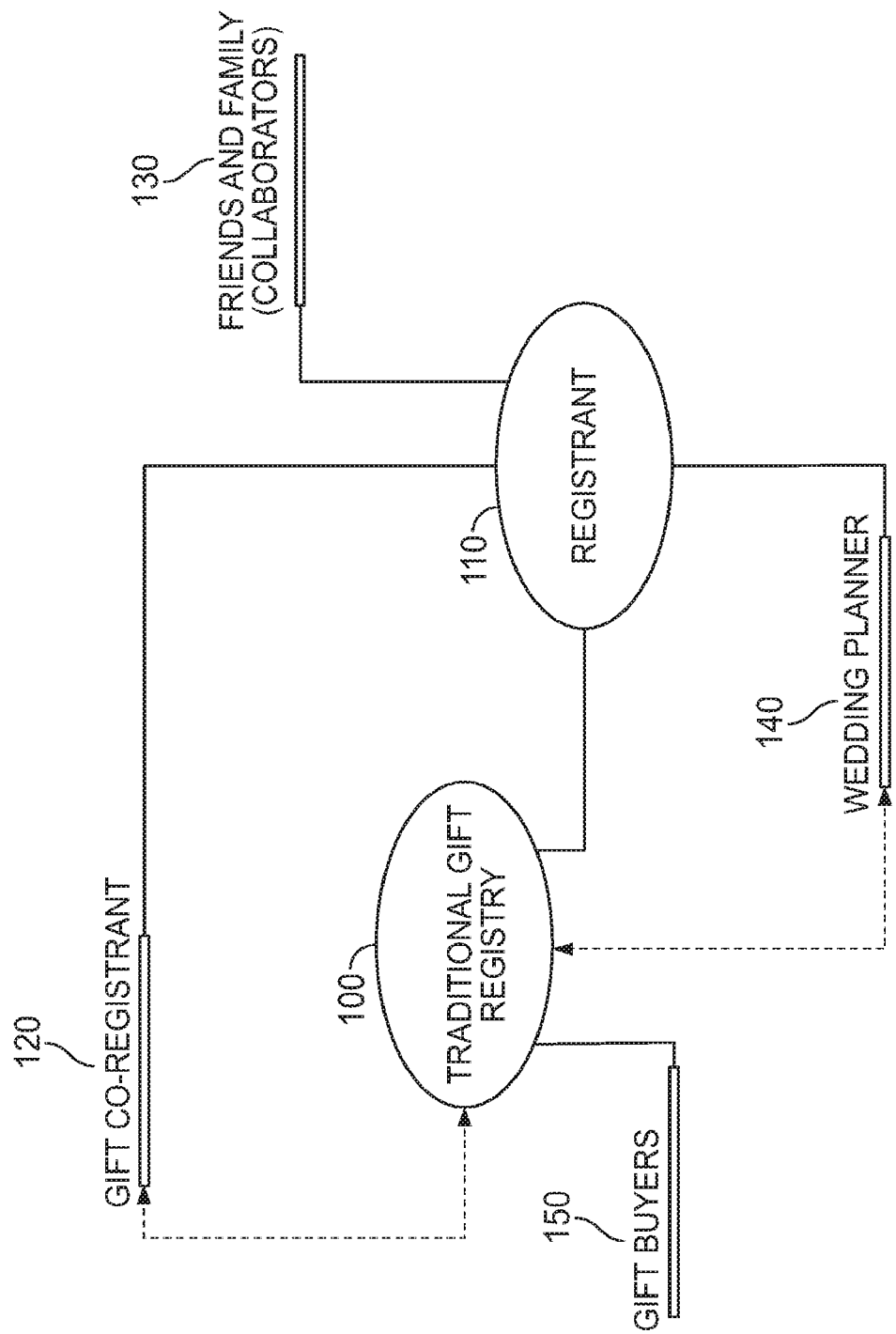
FIG. 1 is an illustration of the relationship of a traditional gift registry with a registrant, a co-registrant, and collaborators (i.e., friends and family) and others (e.g., wedding planner and gift buyers).

Aspects of the present invention relate to the components and operation of a gift registry. More specifically, certain aspects of the present invention relate to systems and methods for a gift registry that supports a portable and extensible social media web application that enhances the gift registry experience by allowing more interaction among a registrant, co-registrants, and collaborators including friends and family members. Representative embodiments of the present invention include what may be also referred to herein as a "social gift registry" that removes the burden from the registrant, makes the registry interaction the focal point of the experience, and transforms the traditional gift registry process by merging the registrant's circle of friends and family with life's milestone occasions using technology. A representative embodiment of the present invention may also be referred to herein as a "social wish list." While a "social gift registry" may be used for larger, more complex events such as, for example, a wedding, or the birth of a child, a "social wish list" in accordance with a representative embodiment of the present invention may be used for events such as, for example, birthdays and holidays, and may have features that are a subset of those of the "social gift registry."

A representative embodiment of the present invention may comprise a number of different collections of data, data banks, or databases about, for example, various characteristics of one or more gift registry "registrants," products or services preferred or selected by each of the registrants, and the individuals that are members of a social network of each gift registry registrant. These collections of data may, in some representative embodiments, be used to keep the registrant and his/her social network informed and up-to-date about the activities and information related to a life event such as, for example, a wedding, a birthday, an anniversary, or other significant occurrence in a registrant's life.

As utilized herein, the terms "exemplary" or "example" means serving as a non-limiting example, instance, or illustration. As utilized herein, the term "e.g." introduces a list of one or more non-limiting examples, instances, or illustrations.

It should be noted that although much of the following discussion describes the features and operation of a "social gift registry" in ways that may be interpreted to apply to access via a web site using an Internet browser on a personal computer (PC), representative embodiments of the present invention are not necessarily limited in that regard, unless so claimed. The various access and communication aspects of representative embodiments of the present invention may involve the use not only of Internet access using a PC, but may also be enabled using various combinations of PCs, mobile devices such as "smart phones," public and private kiosks, set top boxes, interactive game systems, and other suitable electronic devices connected via wireless and/or wired telephone, Internet, and/or cable television infrastructures.

FIG. 1 is an illustration of the relationship of a traditional gift registry 100 with a registrant 110, a co-registrant 120, and collaborators 130 (i.e., friends and family) and others (e.g., wedding planner 140 and those wishing to give a gift referred to herein, and illustrated in FIG. 1 as gift buyers 150). As shown in FIG. 1, the registrant is primarily responsible for management of the traditional gift registry 100. The gift buyers 150 typically access the traditional gift registry 100 by physically visiting the store in which the traditional gift registry 100 resides or, in some cases, may access the traditional gift registry 100 online, but the action taken by the registrant with respect to the traditional gift registry 100, and all communication between the registrant 110, co-registrant 120, collaborators 130, and others, typically takes place separate from the traditional gift registry 100, whether or not the communication relates to the event for which the traditional gift registry 100 was established.

In contrast, a social gift registry in accordance with a representative embodiment of the present invention provides the functionality needed for the those celebrating a life event, including entire groups of friends and family members, to communicate with each other, manage the event gift registry, and actively participate with the celebrant/registrant, rather than passively send a gift and/or attend a particular activity or event. The social media aspect of a representative embodiment of the present invention enhances the gift registry process by transforming it into a seamless experience that integrates with the registrant's life event. Representative embodiments of the present invention deliver a social experience in which registrants can seek help and advice from individuals in his or her network to create and manage their gift registries. As of the date of the present patent application, the applicant knows of no public concept of a social gift registry online process as described herein.

A social gift registry in accordance with a representative embodiment of the present invention solves many of the problems that result from the inexperience and uncertainty of a registrant regarding what gift items to select, by allowing for collaboration with others, such as, for example, family and friends. In addition, a representative embodiment of the present invention solves many of the problems experienced by registrants who are too busy to focus on the event gift registry as much as they'd like to due to higher priorities.

Figure 2:
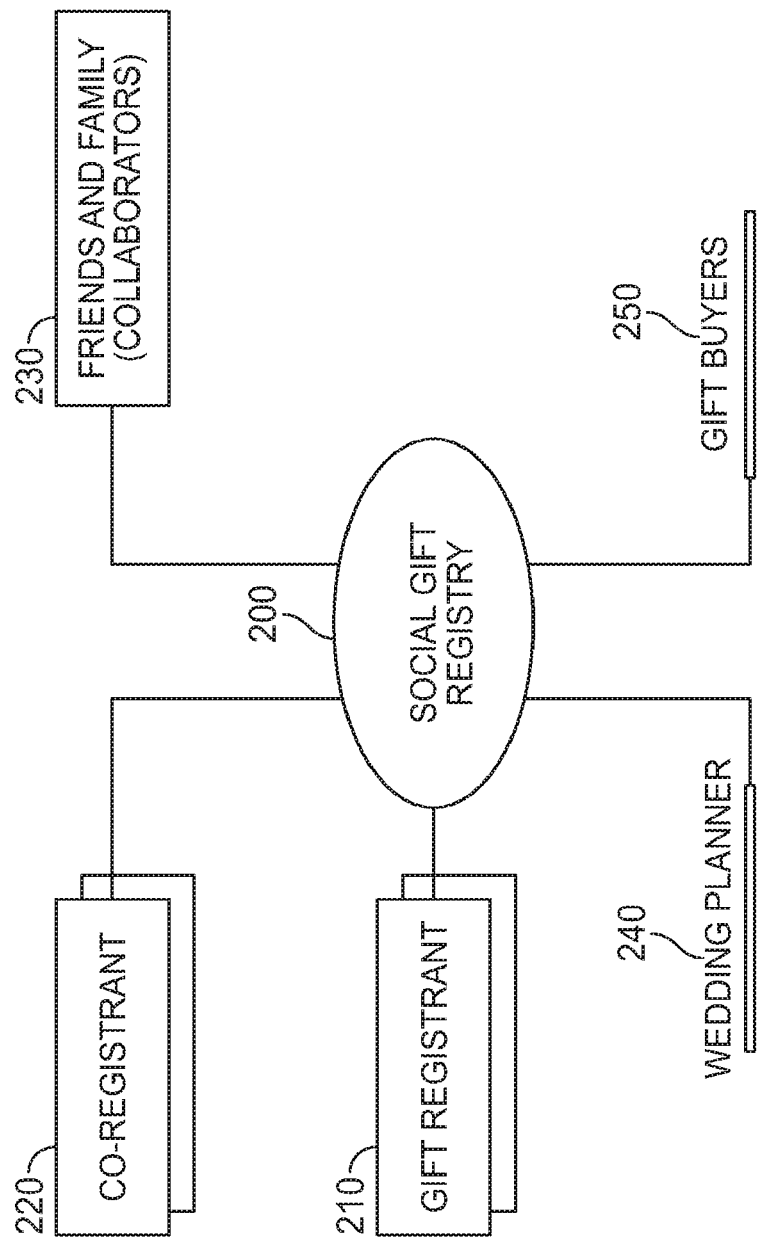
FIG. 2 is an illustration of the relationship of a social gift registry with the registrant, co-registrant, and collaborators (i.e., friends and family) and others (e.g., wedding planner and gift buyers), in accordance with a representative embodiment of the present invention.

FIG. 2 is an illustration of the relationship of a social gift registry 200 with the registrant 210, co-registrant 220, and collaborators 230 (i.e., friends and family) and others (e.g., wedding planner 240 and gift buyers 250), in accordance with a representative embodiment of the present invention. As shown in FIG. 2, the social gift registry 200 is a central hub that provides the functionality supporting social interaction by the individuals with whom the registrant 210 is involved for a particular life event. Each of the registrant 210, co-registrant 220, and collaborators 230 interact with and through the social gift registry 200.

In a representative embodiment of the present invention, participants may take on any of a number of roles including the registrant 200, as mentioned above. In addition, participants may act in the roles of, for example, a gift registry manager, the co-registrant 220 of FIG. 2, and the collaborators 230. Additional possible roles not shown in FIG. 2 include, for example, wedding planner, event planner, event host, shower host, guest, and reception manager. In a representative embodiment of the present invention, each role may have defined functions in the registry experience. For example, an event host may send out the invitations to an event such as a bridal or baby shower, manage a guest list, send out reminders, and handle questions, to name only a few possible actions.

It should be noted that in a representative embodiment of the present invention, someone such as, for example, the gift buyer 250 that has not provided to the operator or sponsor of a social gift registry the information needed to contact the gift buyer 250, may not be enabled to participate in the social interaction aspects of a representative embodiment of the present invention, and may experience the life event in a more traditional fashion, as described above with respect to FIG. 1. That is, without the information that permits social communication with the gift buyer 250, a representative embodiment of the present invention may not include the gift buyer 250 in the distribution of the various communications concerning the activities surrounding the life event of the registrant. A representative embodiment of the present invention, recognizing that such a gift buyer 250 is unable to fully participate in the life event of the registrant, may automatically encourage or incent the gift buyer 250 to provide the information to allow them to take part more fully in the social interactions of the registrant, co-registrant(s), collaborators, and others.

In addition, a representative embodiment of the present invention may provide tools appropriate to each of the roles, to aid assigned individuals with their respective tasks. For example, the event host may have at their disposal a reminder manager tool, and the wedding planner may have access to tools such as a "dashboard," a "to-do list," and/or a source of vendor recommendations, to name only a few.

In addition, a representative embodiment of the present invention may have what may be referred to herein as a "Thank You Note" manager. Such a tool provides a way for the registrant/co-registrant(s) to, for example, keep track of the item(s) in the gift registry that were purchased, the name of the individual(s) that purchased them, and a record of whether a thank you note has been sent, and when. If a system supporting the gift registry of the present invention (e.g., the e-commerce platform 150 of FIG. 1) has information about the gift giver and/or when a particular item was purchased, the "Thank You Note" manager may fill in that information automatically. In addition, if a received gift was a group purchase, the "Thank You Note" manager may permit the registrant/co-registrant(s) to add the names of each of the members of the group giving the gift, permitting the registrant/co-registrant(s) to track the sending of a thank you note to each member of the group. In a representative embodiment of the present invention, the "Thank You Note" manager may also permit the registrant/co-registrant(s) to record the receipt of gifts not listed in the gift registry, such as those from friends, relatives, and others that may have given a personal or heirloom item, or that have made a purchase without consulting the gift registry, along with the name(s) of those giving the gift. The "Thank You Note" manager may also provide information about items in the gift registry that were not purchased, and may permit the registrant/co-registrants to view those items.

A representative embodiment of the present invention may permit the registrant to grant full administrative privileges to an individual referred to herein as a co-registrant. A co-registrant may be, for example, their future spouse, a parent, or a close friend, or a representative from a company that provides event planning and management.

As mentioned above, a representative embodiment of the present invention introduces the concept of collaborators. Collaborators may be, for example, members of the registrant's group of friends and family, or non-family parties involved in planning or managing a life event. In a representative embodiment of the present invention, the registrant may grant limited administrative privileges to none of, some, or all of the collaborators, empowering each of the collaborators designated by the registrant to have an active role in the registry process for an event. A representative embodiment of the present invention facilitates communication between the registrant, a co-registrant, collaborators, and those purchasing gifts related to the event. A representative embodiment of the present invention may provide the registrant, co-registrant, and collaborators with information that gives those event participants a view into similar registries made available to others such as, for example, registries containing items selected by people celebrating a similar milestone event in life. As mentioned above, a representative embodiment of the present invention introduces the concept of a gift registry manager to coach the registrant through the event at scheduled intervals (e.g., by time milestone and/or event milestone) along the registry timeline.

A representative embodiment of the present invention provides for what are referred to herein as "news" or "activity" feeds. An activity feed is a way for participants such as, for example, the registrant, co-registrant if present, and others to quickly view and assess the interactions that have occurred for the gift registry. Items that may be displayed as part of an activity feed include, but are not limited to, an indication of the addition of items to or deletion of items from the gift registry, participant comments on items in the gift registry, and the sharing of the gift registry with another by a participant. An activity feed in accordance with a representative embodiment of the present invention may also include indications of, for example, updated wedding or shower information, and messages automatically generated by the gift registry system in regards to items in the gift registry such as, for example, an indication of when an item is out of stock, notices of items currently on promotion, and the like. Such messages may be referred to herein as "system generated stories" that may reflect, among other things, the activities of the registrant/co-registrant(s), collaborators, friends, and others. The activity feed may also include messages automatically generated by the gift registry system (e.g., "system generated stories") regarding management of the gift registry such as, for example, when all items in a particular product category have been purchased; a suggestion to the registrant/co-registrant to consider selecting additional products/gift items in a particular price range, and the like. In addition, the activity feed may be populated with messages automatically generated by the gift registry system (i.e., "system messages" or "system stories") concerning management of the life event.

In a representative embodiment of the present invention, the activities of registrants and co-registrants may also be displayed on a "wall" that is accessible to and available for viewing by other participants.

In a representative embodiment of the present invention, a registrant may view the items in their gift registry using what may be referred to herein as a "view registry" web page. The items in the gift registry may be sorted for viewing using any of a number of parameters such as, for example, by price (e.g., in which items are ordered in order of price from low to high, or high to low), and by category, to name only two possible parameters, and may be viewed in what is referred to herein as a "gallery view." Additional ways for registrants to assess their gift registry, including adding measures of social interaction such as, for example, sorting of the gift registry by items that have been purchased and sorting of the gift registry by items with which others have interacted such as, for example, those that have been recommended, liked, commented on, and/or viewed by participants.

In a representative embodiment of the present invention, participants (e.g., the registrant, co-registrant, collaborators, those buying gifts, and others) may add comments right within the gift registry (e.g., from with the view registry page), which may be accessible to all participants, including gift buyers. Participants may have conversations with each other and the registrant and/or co-registrant. In some representative embodiments of the present invention, comments made within the gift registry may stay within the gift registry, and may not be accessible or viewable outside of the gift registry. Thus, in some representative embodiments of the present invention, registrants, co-registrants, collaborators, and the gift registry manager may all make comments and have conversations about products in the gift registry that only members of the registrants' network (i.e., a co-registrant, designated collaborators, and selected other participants) can view.

A representative embodiment of the present invention may also enable the registrant to engage in private conversations with anyone else in the gift registry. In addition, any participant such as, for example, the registrant, a co-registrant, any of the collaborators, and others may ask questions of the gift registry manager.

Communications between participants may be via any of a number of different modes or forms, including for example, chat, email, interactions occurring in a forum, Skype™, and screen sharing, to name only a few modes. In a representative embodiment of the present invention, questions submitted by any of the participants may, for example, be answered by members of the staff of a vendor operating, sponsoring, or directly related to the gift registry, including for example, sales associates, other company associates, those individuals that are part of a "Help Desk" organization, and others. Any questions submitted by users of the gift registry and the corresponding answers provided by others may be kept and organized so that they are retrievable, and be made part of an a list of "frequently asked questions (FAQs)" that may form a knowledge base for the registrant, co-registrants, collaborators, and others involved in the life event of the registrant/co-registrant(s).

A representative embodiment of the present invention may provide a number of ways for a registrant to find products for inclusion in the gift registry. For example, the operator or sponsor of the gift registry may offer the registrant the ability to select from one or more "starter registries" created by or for the operator of the gift registry, where each starter registry contains products/items selected by the operator of the gift registry. A representative embodiment may also make available one or more "public registries," that may be created by other registrants that have chosen to allow their own gift registry to be made public. In addition, a representative embodiment of the present invention may enable a registrant to select a gift registry created as a collection of the "most popular products," and such collections may be organized by product category. The registrant/co-registrant(s) may select gifts from product item collections identified by a brand name. Such a gift registry may contain products/items selected based on metrics from sales through any of a number of sales channels including, for example, Internet merchants, conventional "brick and mortar" businesses, or any combination of sources of product sales/purchase information. A representative embodiment of the present invention may also offer the registrant a "Product Checklist," to aid in their selection of products/items for their own gift registry. In addition, a representative embodiment of the present invention may provide information about products according to the area of a home in which the products would be located or used, and may provide product items that are customer "top picks" by room. The registrant/co-registrant(s) may hover a cursor over such "top pick" items to cause information (e.g., a picture and/or name) of one or more members of their personal social network that have interacted with a listing for the "top pick" item. Information about product items may also be organized by interest or by style (e.g., cook, entertainer, renovator).

A representative embodiment of the present invention may provide to a registrant ways to find products that a registrant may choose to include in their own gift registry. For example, a registrant may nominate their own gift registry to be made available to others. In addition, a registrant may search for and locate one or more of the "public registries" mentioned above using specific features of the event, of product categories, or of products. A representative embodiment of the present invention may employ algorithms that use, for example, various pieces of statistical information related to product sales, product demand, product polls, and focus groups. A representative embodiment of the present invention may employ machine learning or other techniques to return products or gift registries that are suitable as an initial or starting gift registry for the registrant in view of their current life event.

In addition, in a representative embodiment of the present invention, a registrant may request others to help them create their registry (e.g., via "crowdsourcing"). A registrant may, for example, ask that others not necessarily part of their own network be polled for opinions on products. The individuals polled may be selected from, for example, individuals of similar age, individuals that live in the same geographic region, or individuals that match one or more other characteristics of the registrant. Further, a representative embodiment of the present invention may enable registrants to find products according to statistics tracked and/or provided by the operator or sponsor of their gift registry, by one or more other businesses operated by the operator or sponsor of their gift registry, or by operators of related businesses, to determine product information by category such as, for example, the most/least popular products, the most/least mentioned products, the products most/least "liked" in a social media sense, the products most/least recommended by consumers or the news media, the products most/least frequently added by other registrants to a gift registry managed by this operator or sponsor, to name only a few useful statistics. A representative embodiment of the present invention may also employ a "recommendation system," to provide information to aid the registrant in selecting products/items for their own gift registry.

A representative embodiment of the present invention may enable individuals or companies with expertise in one or more specific product categories to provide their expert opinion on products, to aid the registrant in selecting products for their gift registry. The registrant may, for example, identify a product and request an opinion about a specific product, or may request an identification of a product meeting a particular condition or characteristic such as, for example, "best value," "most suitable," "lowest cost," or "most compact," "most energy efficient," or the like. These opinions may be available within the gift registry upon request, perhaps through an icon on a web page, or via an invitation. Such opinions may be retained and organized by a representative embodiment of the present invention, and may be used in various ways to aid other registrants in their selection of products/items for their own gift registries.

Upon selection of a product, the registrant may also be provided with information that identifies those members of their personal network that have interacted with that item (e.g., purchased, selected, commented on), and may be shown a picture of such personal network members. Hovering a cursor over a picture of a personal network member that has interacted with or shown some interest in an item may result in the display of an indication as to whether, for example, the pictured individual owns the item, wants the item, likes the item, has reviewed the item, or has recommended the item. The registrant/co-registrant may then request the opinion of the pictured individual.

In addition, a registrant may request an opinion from a celebrity spokesperson associated with the operator or sponsor of the gift registry, or may request opinions through, for example, "crowdsourcing." The individuals polled for opinions via "crowdsourcing" may, for example, be specifically selected based on a match of one or more personal characteristics with those of the registrant. In addition, a representative embodiment of the present invention may supply requested product opinions and information from systems employing artificial intelligence or machine learning algorithms, to aid the registrant in his/her selection of products for their registry.

While some representative embodiments of the present invention may provide static content on advice and help pages, other representative embodiments may enable social interaction to allow a registrant, co-registrant, collaborator, or other supporting the life event to receive advice and help. As mention previously above, a representative embodiment of the present invention may provide expert opinions as specified above, and may gather and make available an "FAQ" or collection/database of "frequently asked questions." Such a collection of information may be available to all users as a knowledge base. Further, the social interaction may include staff of various vendors of items/products including, for example, sales associates, other company associates, and members of a "Help Desk," to can answer questions raised by the registrant, co-registrant(s), collaborators, or others involved in the life event. It should be noted that a representative embodiment of the present invention supports social interaction using any and all ways of communication including, but not limited to, any combination of various forms of chat, email, forums, Skype™, video, and screen sharing, to name just a few forms of social interaction.

Some representative embodiments of the present invention may provide registrants and co-registrants with the ability to transition their gift registries as they move through different life stages. For example, a representative embodiment of the present invention may enable an individual that has a gift registry created for a celebration of graduation from college to transition that gift registry into a gift registry suitable for a bridal shower, and may yet later transition that gift registry again to one appropriate for the celebration of the arrival of a first child. A representative embodiment of the present invention may enable members of the network of a registrant to suggest this.

A representative embodiment of the present invention may provide a registry-specific news and activity feed, which is made available to the registrant, the co-registrant, and the collaborators. Such a registry-specific news and activity feed may update all active gift registry participants with registry-specific user activity and event information including, but not limited to, notification when an item/product is added to the gift registry, when a comment is made on the gift registry, when a gift registry system message is posted, when a "gift registry manager" posts a message, when the gift registry is shared, when an event date is updated, and when a shower date is updated, to name only a few possible notifications.

A representative embodiment of the present invention enables the registrant, co-registrant(s), and their friends and families to stay actively engaged and informed about the gift registry and the event timeline. The synergistic integration of social media technology with the gift registry enhances the gift registry process by transforming the gift registry process into a seamless experience that integrates with the registrant's/co-registrant's life event.

Various representative embodiments of the present invention may include support for the automatic creation and distribution of messages such as, for example, email, text messages (e.g., Short Message Service (SMS) or Multimedia Message System (MMS) messages), and other forms of electronic communication to the registrant, co-registrant(s), collaborators, and others involved in the life event. Such messages may be related to gift registry activity, as described above, or may be messages from members of the registrant's network (e.g., the co-registrant and collaborators.) The schedule for such communication may be based, for example, on various milestones that typical occur for the life event of the registrant/co-registrants, or may be customized by the registrant/co-registrant(s) for specific dates of significance. In this way, a representative embodiment of the present invention may automatically communicate with the registrant/co-registrant(s) related to significant or important dates for their life event. For example, a representative embodiment of the present invention may schedule one or more email messages according to how much time has passed since the registrant registered with the gift registry, and how much time is left until their life event (before and after).

A representative embodiment of the present invention may automatically send messages for a variety of types of content. For example, some automatically distributed messages may be related to the status of items/products listed in the gift registry, such as when an item in the registry is out of stock, or when a particular item has been purchased, to name only two. Some of the automatically transmitted messages may be related to social interaction aspects including, but not limited to, invitations to co-registrant(s) or collaborators, or the sharing of information with event guests. Other automatically generated messages may be promotional in nature, sent on behalf of the operator or sponsor of the gift registry to provide information related to, for example, information or reminders relating honeymoon planning, gifts for the wedding party, getting in shape, and the like. In a representative embodiment of the present invention, the cadence and content of such system generated communication may be based on the interaction of the recipient with the transmitted message such as, for example, the rate at which messages are opened by a recipient, and the occurrence of "click-throughs" and/or "sell-throughs".

Figure 3:
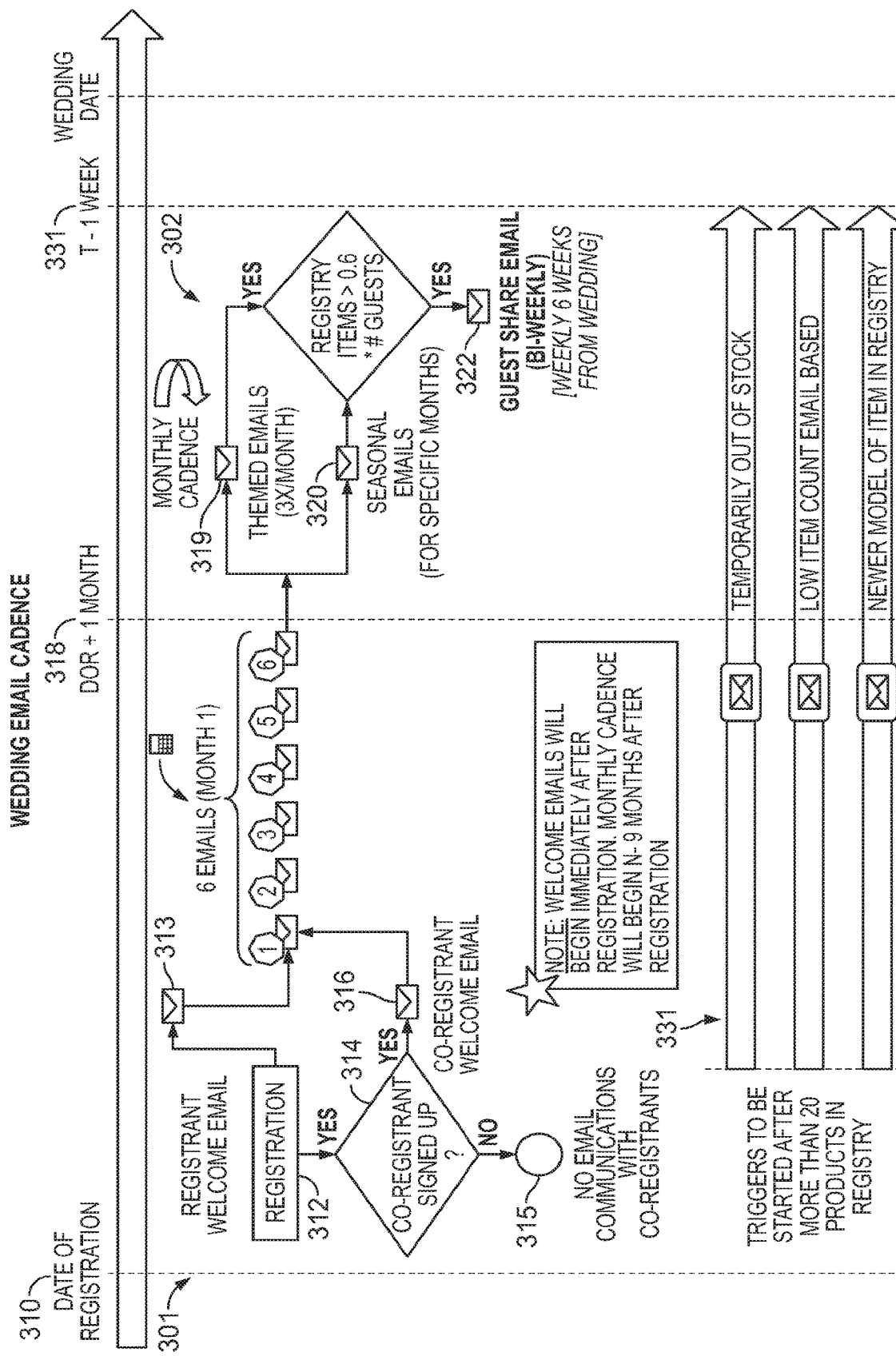
FIG. 3 is an illustration of an exemplary cadence for messaging generated by a gift registry that may correspond, for example, to the gift registry of FIG. 2, for the period from registration of the registrant to one week before the related life event, in accordance with a representative embodiment of the present invention.

FIG. 3 is an illustration of an exemplary cadence for messaging generated by a gift registry that may correspond, for example, to the gift registry 200 of FIG. 2, for the period from registration of the registrant to one week before the related life event, in accordance with a representative embodiment of the present invention. Although the messaging mechanism of FIG. 3 is indicated to be email, it should be understood that the use of email for messaging does not represent a specific limitation of the present invention, and that a variety of other communication mechanisms may be employed such as, for example, one or more of chat, email, forums, and texting (e.g., SMS or MMS), to name only a few.

As shown in FIG. 3, the date of registration 310 by a registrant may initiate a series of messages and reminders related to the life event of the registrant. For example, FIG. 3 shows a flowchart of an exemplary method 301 beginning with a registration event at block 312, which results in the sending to the registrant of a "welcome" email 313. The welcome email 313 is followed in the example of FIG. 3 by a series of an additional six emails 330 sent to the registrant during the month following the date of registration 310. The method 301 then, at block 314, determines whether a related co-registrant has signed up. If it determined at block 314 that a co-registrant has signed up, then a co-registrant "welcome" email 316 is sent to the co-registrant, otherwise, the method 301 determines that no email communication is to take place with co-registrants.

In the example of FIG. 3, at the end of the first month 318 following registration, a second method 302 of communication begins. It should be noted that the switch to a different algorithm for determining when to communicate with the registrant, co-registrant, and collaborators, such as the method 302, need not begin at one month into the milestones leading to the life event, but may be at any cadence or interval selected by the operator or sponsor of the social gift registry, or the registrant, co-registrant, or in some cases, the collaborators, and may be automatically adjusted based on responses of the recipients to the communications sent by a representative embodiment of the present invention, or other variables. In the illustration of FIG. 3, themed emails 319 may be distributed, for example, three times a month, while seasonal emails 320 may be distributed for specific months. In either case, a determination may be made, at decision block 321, whether emails sharing information about the life event (e.g., a wedding) are to be sent to guests. This determination may be based on the number of items listed in the gift registry such as, for example, as shown in FIG. 3, when the number of items in the gift registry exceed 0.6 times the number of guests. If it determined that emails are to be distributed, the emails may then be sent to guests on a weekly basis.

The example of FIG. 3 also illustrates the use of one or more triggers 330 that may become active when a certain number of items are listed in the gift registry. When active such triggers 330 may result in a representative embodiment of the present invention automatically sending emails indicating, for example, when one or more items of the gift registry are out of stock at the vendor of the item, if too few items have been select for the gift registry, or when a newer model of a selected item is available.

Figure 4:
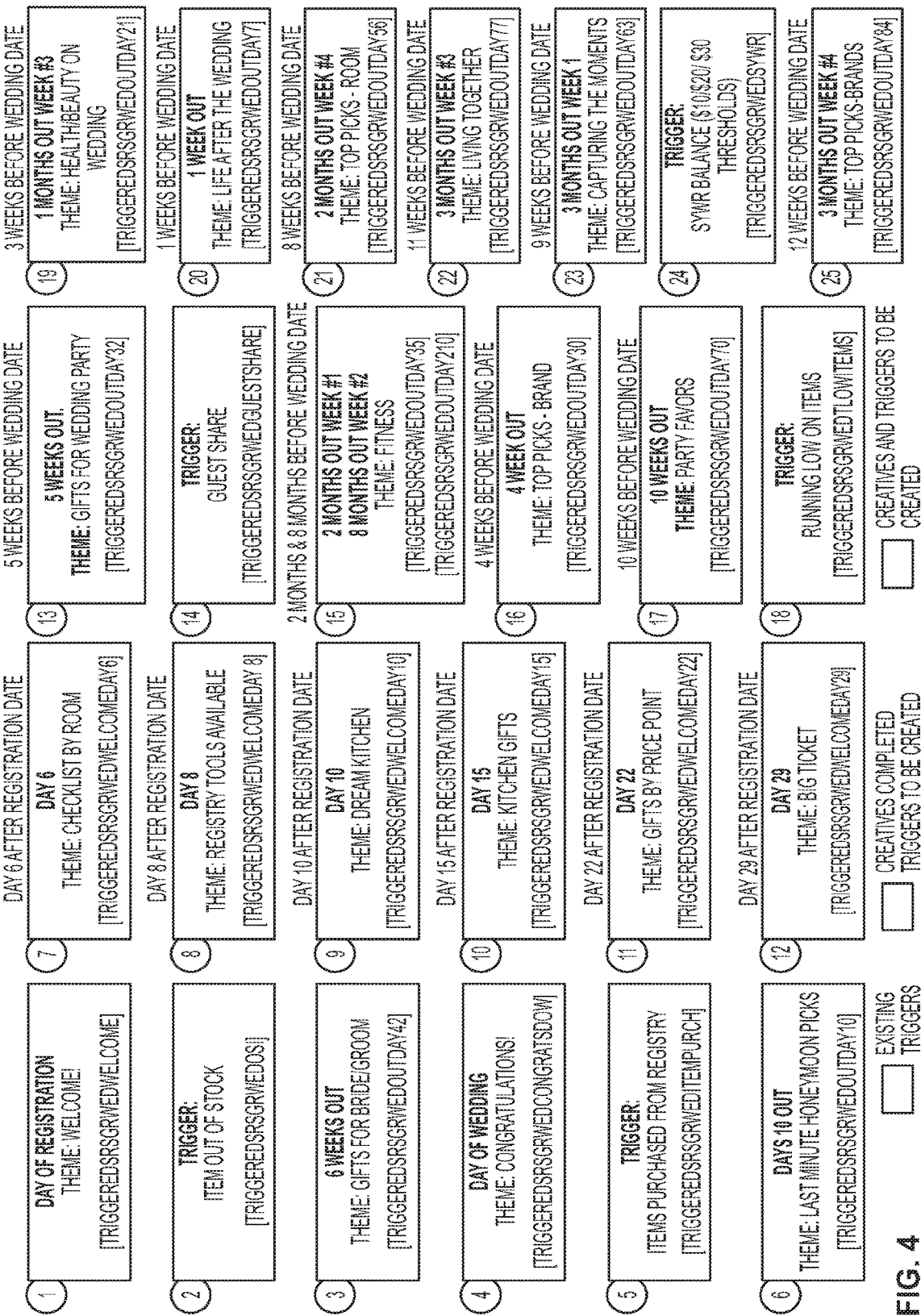
FIG. 4 and FIG. 5 illustrate various exemplary email messages that may be distributed to one or more of the registrant, co-registrant, collaborators, and others based on the amount of time elapsed from the date of registration of a registrant with the gift registry and the amount of time remaining before the occurrence of the related life event, and those email messages whose distribution is based on triggers or conditions related to the state of the items listed on the gift registry, in accordance with a representative embodiment of the present invention.
Figure 5:
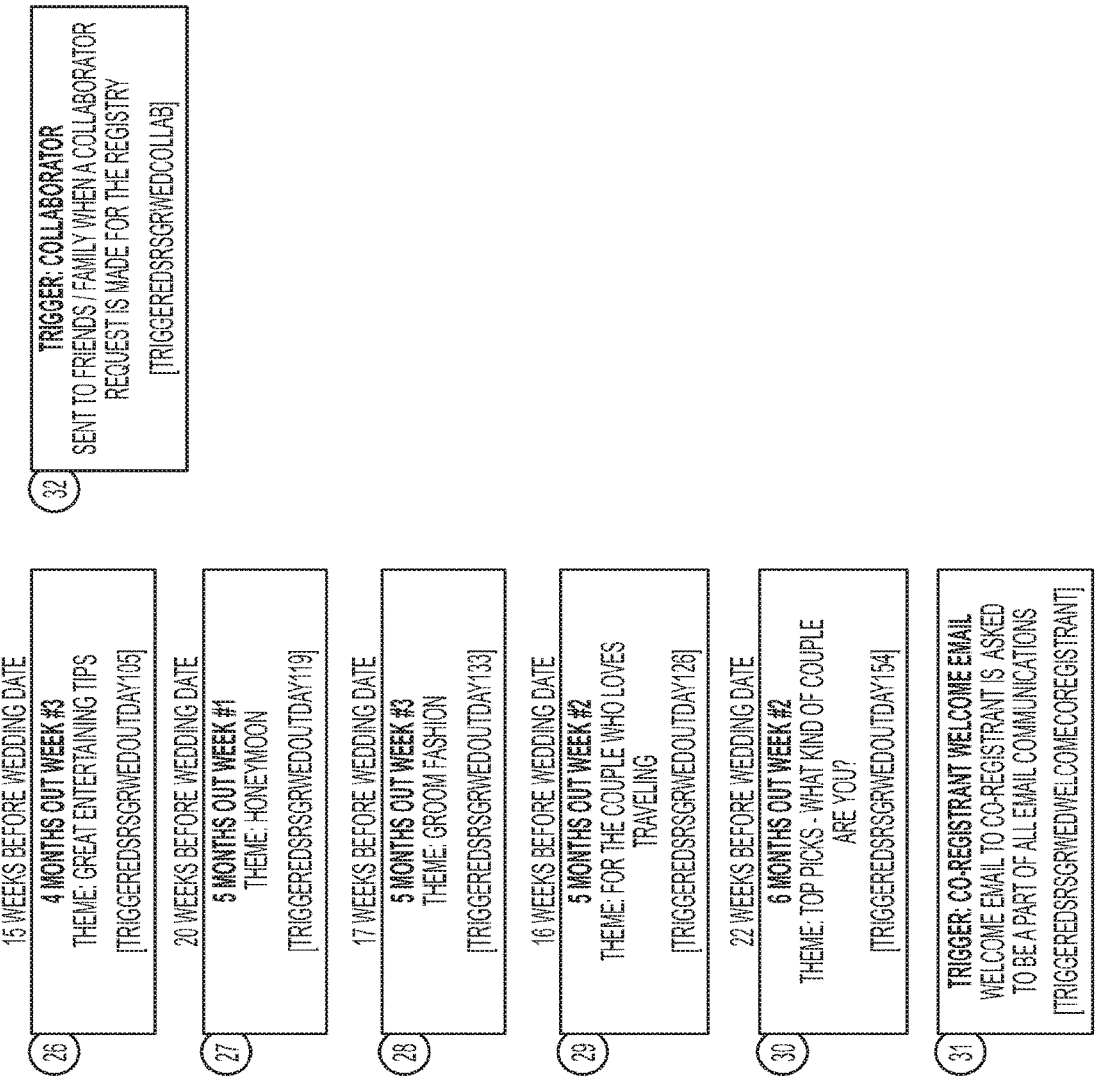

FIG. 4 and FIG. 5 illustrate various exemplary email messages that may be distributed to one or more of the registrant, co-registrant, collaborators, and others based on the amount of time elapsed from the date of registration of a registrant with the gift registry and the amount of time remaining before the occurrence of the related life event, and those email messages whose distribution is based on triggers or conditions related to the state of the items listed on the gift registry, in accordance with a representative embodiment of the present invention.

Figure 6:
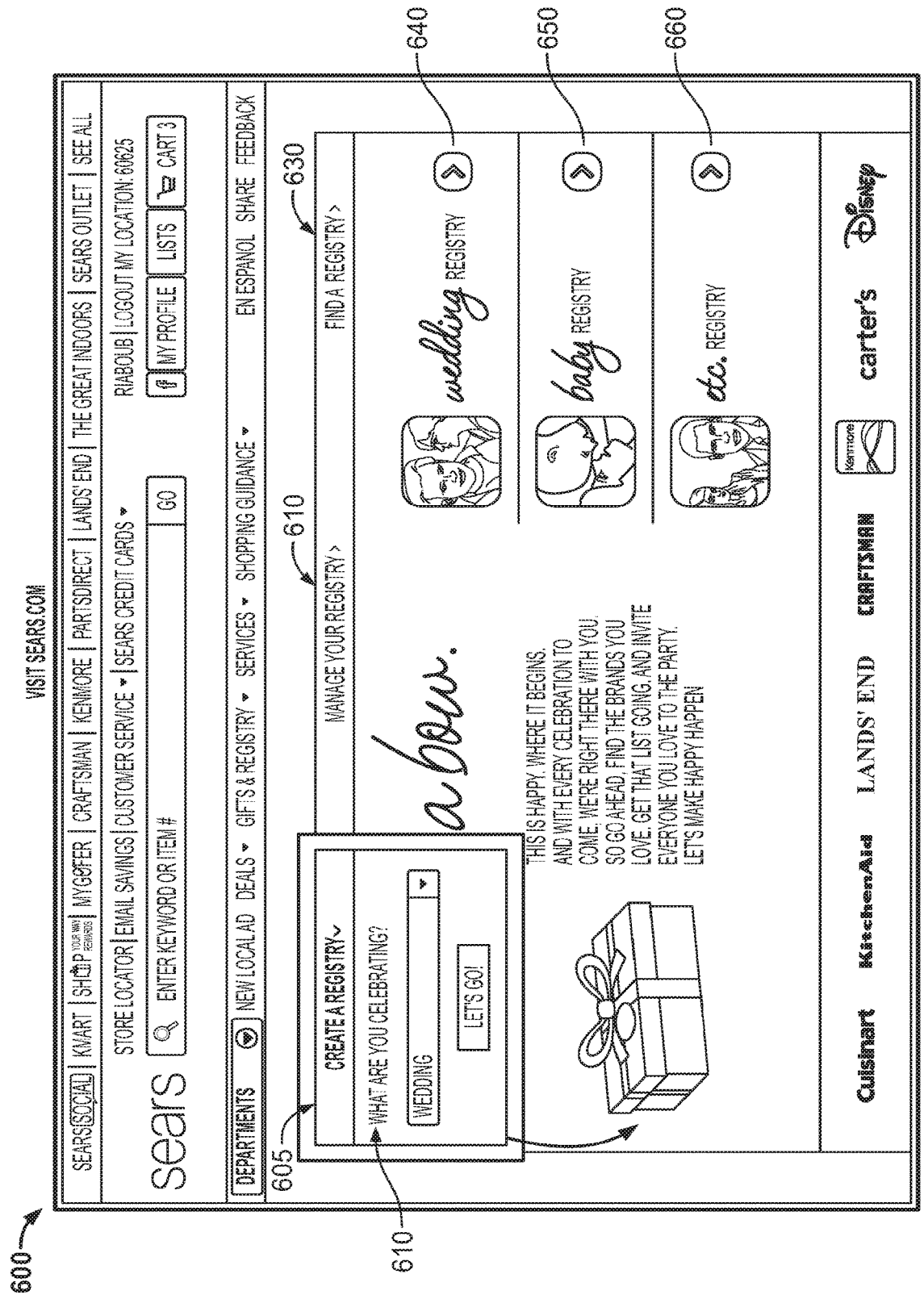
FIG. 6 shows an exemplary vendor or sponsor web page that provides options for a user to create a new gift registry, manage an existing gift registry, or to search for an existing gift registry, in accordance with a representative embodiment of the present invention.

FIG. 6 shows an exemplary vendor or sponsor web page 600 that provides options for a user to create a new gift registry, manage an existing gift registry, or to search for an existing gift registry, in accordance with a representative embodiment of the present invention. As shown in FIG. 6, web page 600 includes a create registry option 605, which when selected permits the user to create their own gift registry, beginning with user selection of the life event for which the gift registry is being created. The web page 600 also includes a gift registry management option 610, to enable a user that has previously created a gift registry to make additions or changes to gift registry-related information. In addition, the web page 600 includes a find registry option 630, to locate a gift registry for an identified individual. The viewer of web page 600 may also use dedicated command buttons to create a wedding registry using wedding registry option 640, a baby registry using baby registry option 650, or a registry for another occasion using a catch-all "etc." option 660.

Although not shown in FIG. 6, the registrant/co-registrant(s) may be presented with one or more screens or web pages that enable them to enter their personal information such as, for example, the date and type of the event, their names, email address(es), residence addresses, and telephone number(s), whether they wish to be notified when a gift on the registry is purchased, whether the registry is to be kept private, and whether gift cards and/or group gifting is acceptable. If any information about the registrant/co-registrant(s) is already known to a system supporting the gift registry (e.g., the e-commerce platform 150), that information may be used to pre-populate corresponding fields. They may also be given the opportunity to select who can see updates to their activity feed, and to specifically identify those that may make changes to the gift registry. The registrant/co-registrant(s) may also be given the option to personalize the appearance of their gift registry with, for example, their own pictures (e.g., a picture for the "cover"), colors, or themes, and may be permitted to select a template to be used to display the product items in their registry. When they are finished creating their gift registry, the registrant/co-registrant(s) may "publish" the gift registry, and may, from within the gift registry, use email, the Facebook® social communication network, or other means to invite others to visit their gift registry. In addition, the publishing of the gift registry may be shown as a system generated message or "system story" in their activity feed, based on the permissions or privacy settings of the registrant/co-registrant(s).

Figure 7:
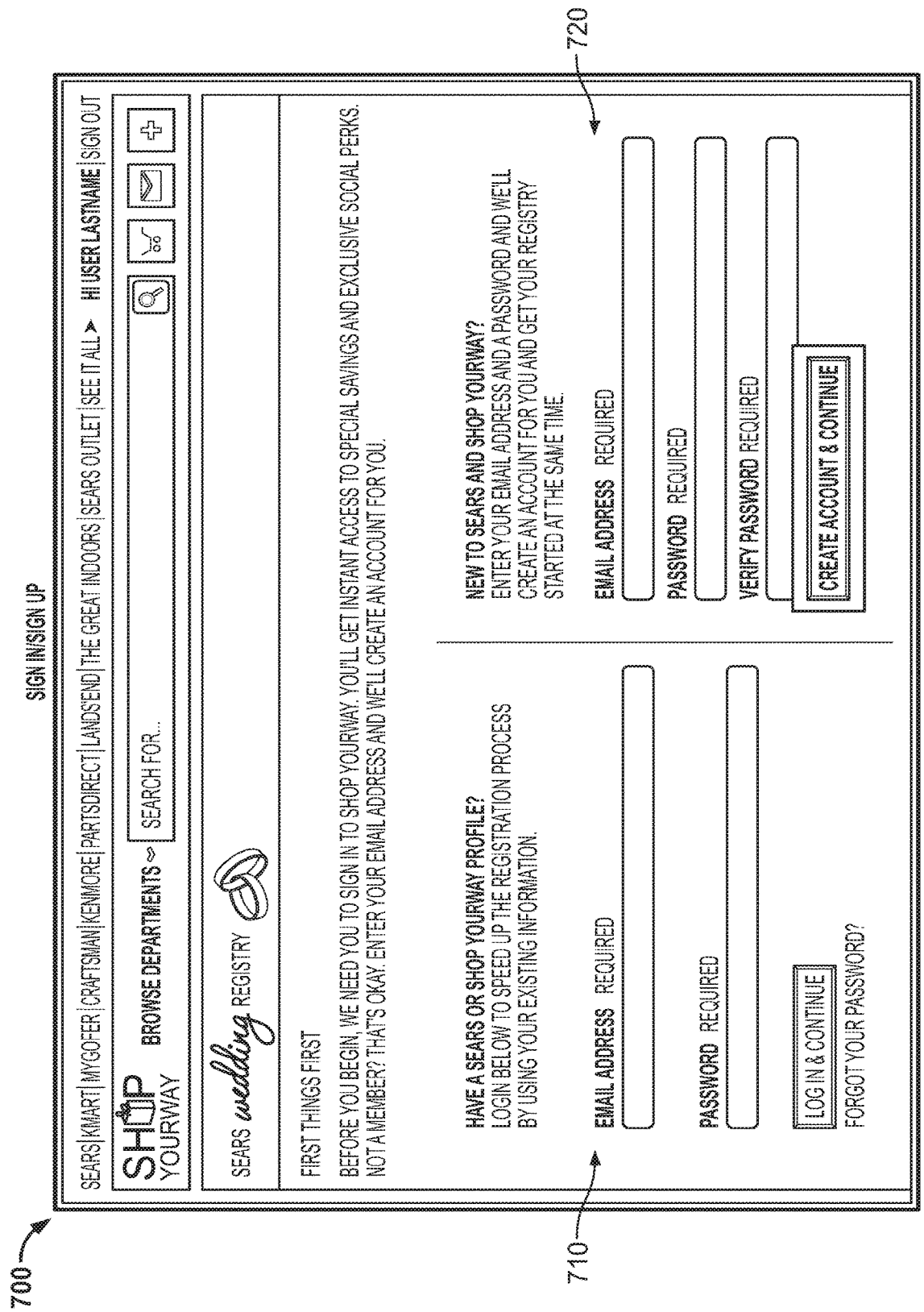
FIG. 7 shows an exemplary sign-in/sign-up web page with a sign-in option that enables a registrant to provide information to allow the user to access a gift registry for which they have previously registered, and a sign-up option that enables a user to submit the information needed to become the registrant and create a new gift registry, in accordance with a representative embodiment of the present invention.

FIG. 7 shows an exemplary sign-in/sign-up web page 700 with a sign-in option 710 that enables a registrant to provide information to allow the user to access a gift registry for which they have previously registered, and a sign-up option 720 that enables a user to submit the information needed to become the registrant and create a new gift registry, in accordance with a representative embodiment of the present invention.

Figure 8:
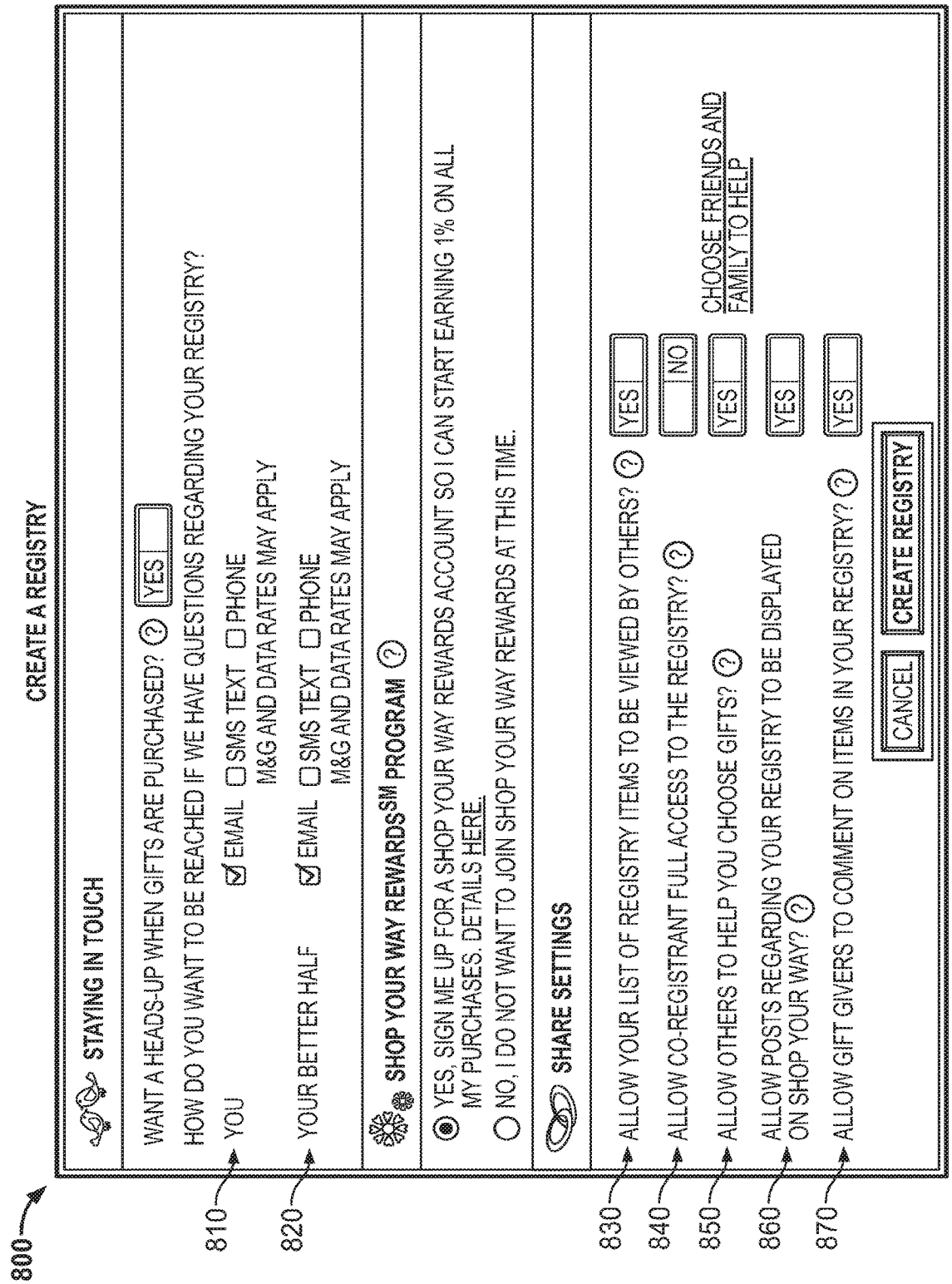
FIG. 8 illustrates an exemplary gift registry creation web page that permits a user to manage communication by the gift registry with the network of the registrant, and to manage sharing and access by the people involved in the life event, in accordance with a representative embodiment of the present invention.

FIG. 8 illustrates an exemplary gift registry creation web page 800 that permits a user to manage communication by the gift registry with the network of the registrant, and to manage sharing and access by the people involved in the life event, in accordance with a representative embodiment of the present invention. As shown in FIG. 8, the registrant is provided with communication options 810, to permit the registrant to choose the means used by the gift registry to communicate with the registrant. The registrant is also provided with communication option 820, to permit the registrant to select the means used by the gift registry to communicate with the co-registrant, which may in the case of a wedding gift registry be the spouse of the registrant, for example. The example of FIG. 8 also provides the registrant with a viewing option 830, which controls whether others are allowed to view items in the gift registry, a co-registrant permissions option 840, which controls whether the co-registrant is given full access to the gift registry, and an "others" permissions option 850, which controls whether individuals other than the registrant and the co-registrant are permitted to choose gifts and handle tasks associated with the gift registry. The illustration of FIG. 8 also includes a display control option 860, which permits the registrant to control whether materials, messages, etc., posted to the gift registry are also displayed to others through, for example, another means of social interaction such as a social networking web site. In addition, the example of FIG. 8 includes a commenting option 870, which permits the registrant to control whether those giving gifts are allowed to comments on items in the gift registry.

Figure 9:
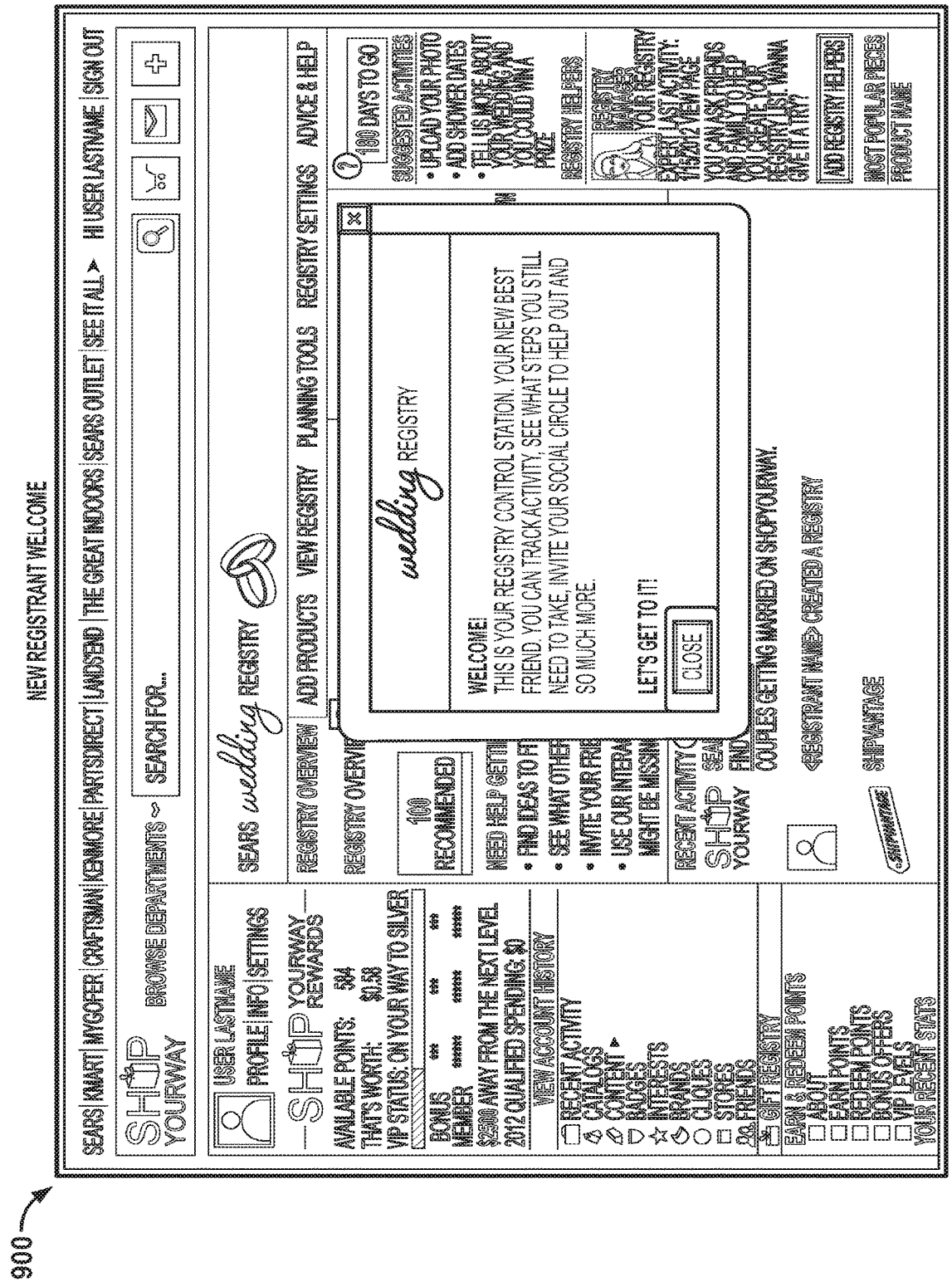
FIG. 9 illustrates an exemplary new registrant welcome web page, in accordance with a representative embodiment of the present invention.

FIG. 9 illustrates an exemplary new registrant welcome web page 900, in accordance with a representative embodiment of the present invention. The new registrant web page may be displayed after the user has completed entry of the information for gift registry creation web page 800 of FIG. 8, for example.

Figure 10:
FIG. 10 illustrates elements of an exemplary wedding registry overview web page, in accordance with a representative embodiment of the present invention.

FIG. 10 illustrates elements of an exemplary wedding registry overview web page 1000, in accordance with a representative embodiment of the present invention. As illustrated in FIG. 10, the wedding registry overview web page 1000 includes a number of items to be selected indication 1010, a number of items already selected indication 1020, and a number of item remaining to be select indication 1030, which display the progress of the registrant/co-registrant in selecting products/items for listing and/or display in their gift registry. The wedding registry overview web page 1000 of FIG. 10 also includes a number of help options 1090 that provide the registrant/co-registrant with access to various types of help in choosing items/products for their gift registry. In addition, the wedding registry overview web page 1000 includes a pie chart 1040 that shows a breakdown of the number of items/products now listed in their gift registry, by price. The wedding registry overview web page 1000 also includes a reminder 1050 of the amount of time remaining before the related life event, a list of suggested activities 1060 appropriate for this life event (i.e., planning and managing the activities that surround a wedding), and an area containing pictures and information 1070 of the collaborators in the handling of wedding activities, in this example, a registry manager. The exemplary wedding registry overview web page 1000 of FIG. 10 also includes a news and activity feed 1080, which displays current information about actions of those involved in the life event and information useful to the registrant/co-registrant. Additional information about news and activity feeds is discussed above.

Figure 11:
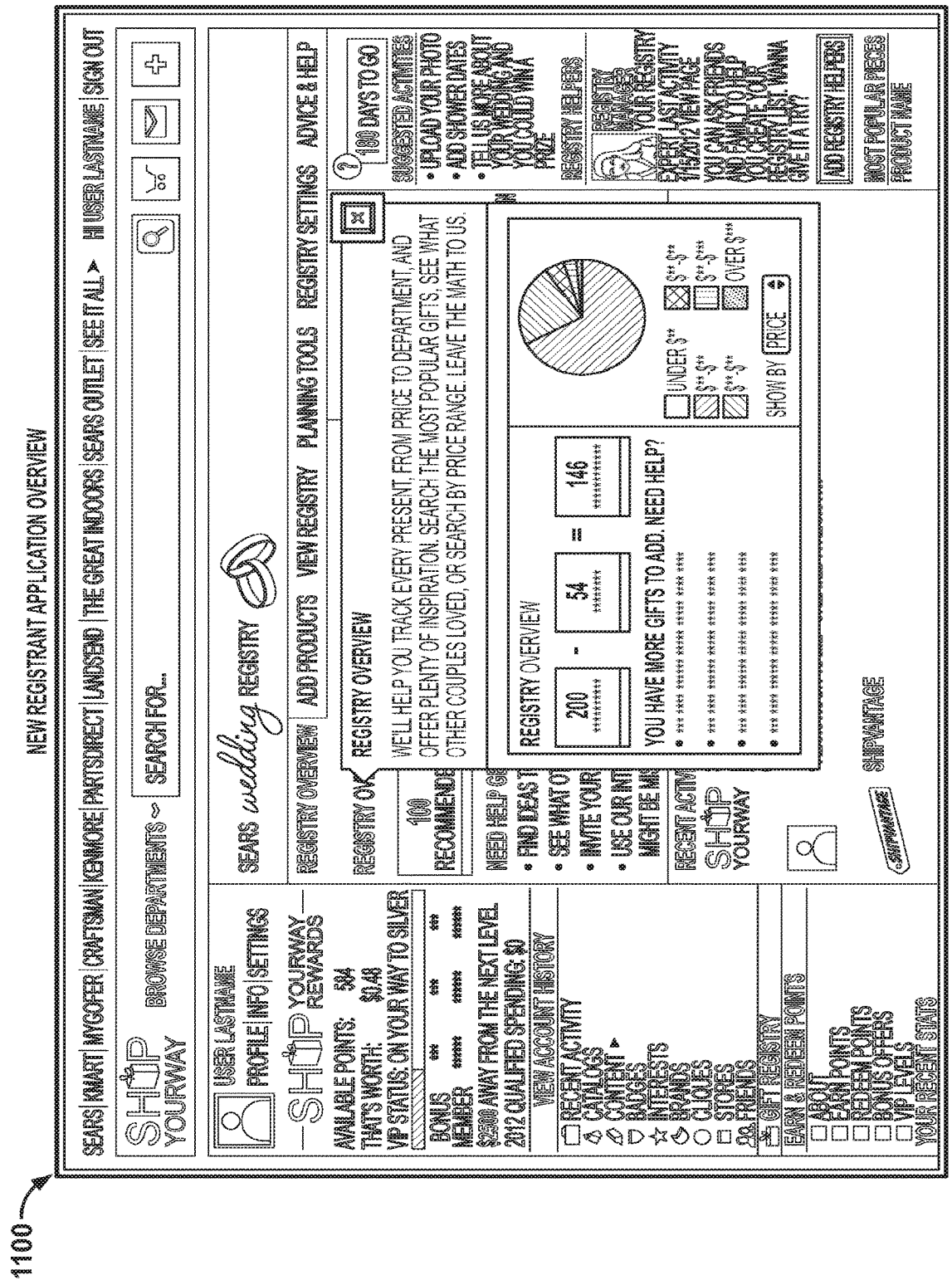
FIG. 11 shows an exemplary tool tip that may be available to a registrant, co-registrant, or collaborator to provide help information to a user as an aid in understanding the features of a gift registry, in accordance with a representative embodiment of the present invention.

FIG. 11 shows an exemplary tool tip 1100 that may be available to a registrant, co-registrant, or collaborator to provide help information to a user as an aid in understanding the features of a gift registry, in accordance with a representative embodiment of the present invention.

Figure 12:
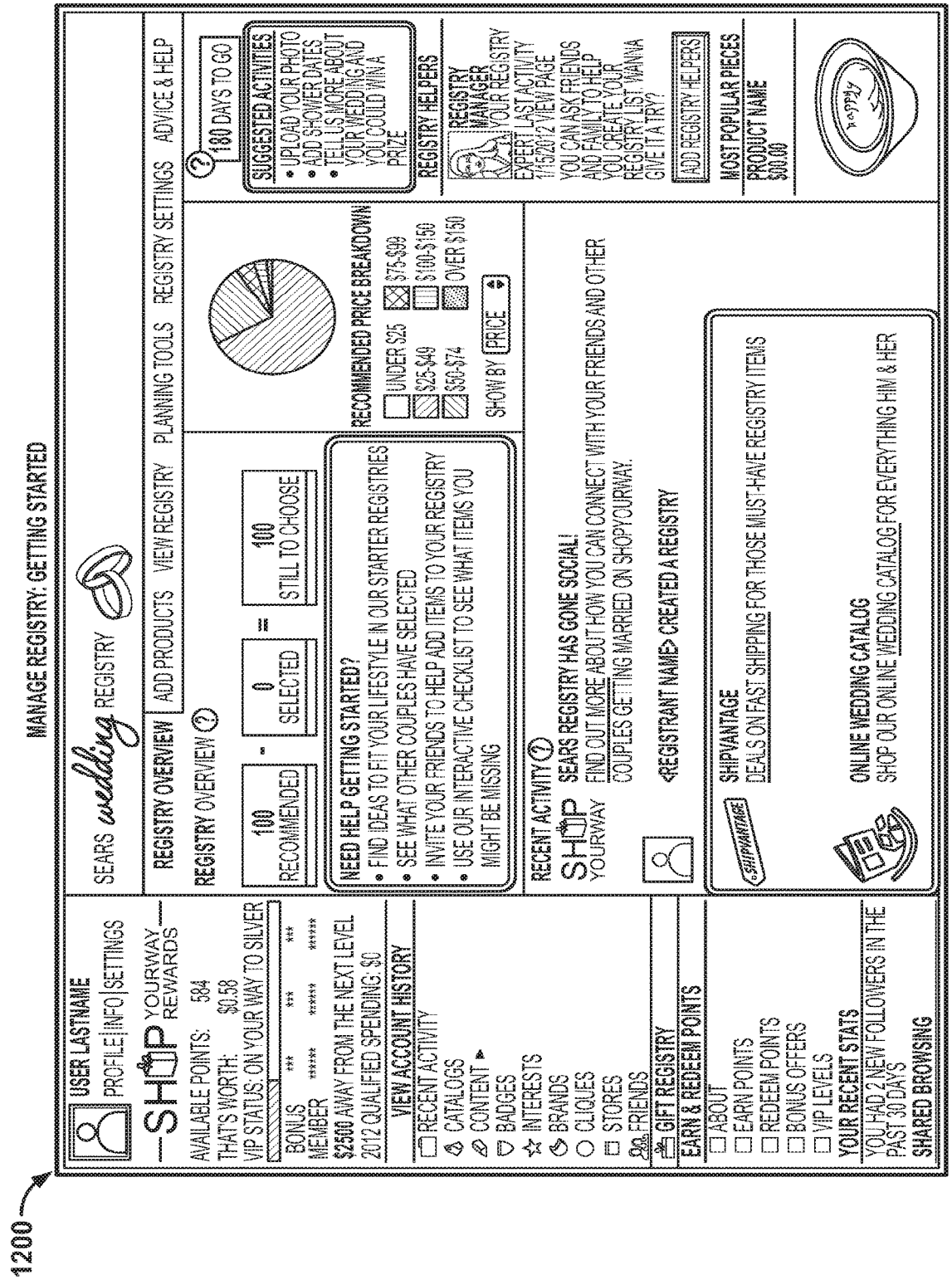
FIG. 12 illustrates another exemplary gift registry web page, in accordance with a representative embodiment of the present invention.

FIG. 12 illustrates another exemplary gift registry web page 1200, in accordance with a representative embodiment of the present invention.

Figure 13:
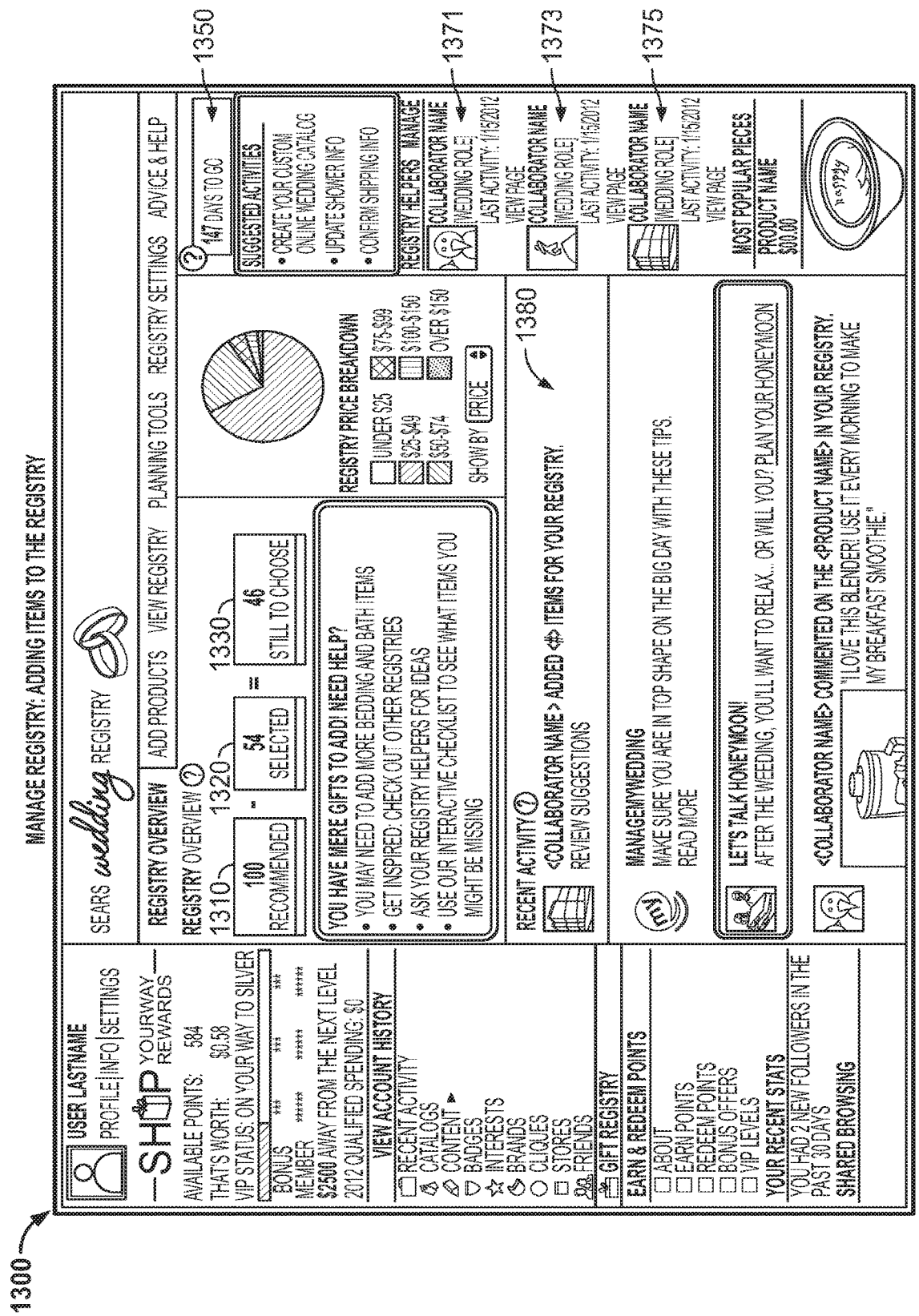
FIG. 13 shows an exemplary gift registry add-item web page, in accordance with a representative embodiment of the present invention.

FIG. 13 shows an exemplary gift registry add-item web page 1300, in accordance with a representative embodiment of the present invention. As illustrated in FIG. 13, the wedding registry overview web page 1300 shows an updated number of items to select indication 1310 (which may be compared to the number items 1010 shown in FIG. 10), an updated number of items selected indication 1320 (which may be compared to the number of items 1020 shown in FIG. 10), and an updated number of items yet to be select indication 1330 (which may be compared to the number of items 1030 of FIG. 10), showing the progress of the registrant/co-registrant in selecting products/items for listing and/or display in their gift registry. As in FIG. 10, the wedding registry overview web page 1300 also includes a reminder 1350 of how much time remains before the related life event (i.e., in the example, 147 days), and includes an area containing pictures and information of those helping in the handling of wedding activities, in this example, collaborators 1371, 1373, 1375. The exemplary wedding registry overview web page 1300 of FIG. 13 also includes a news and activity feed 1380, which displays current information about actions of those involved in the life event and information useful to the registrant/co-registrant.

Figure 14:
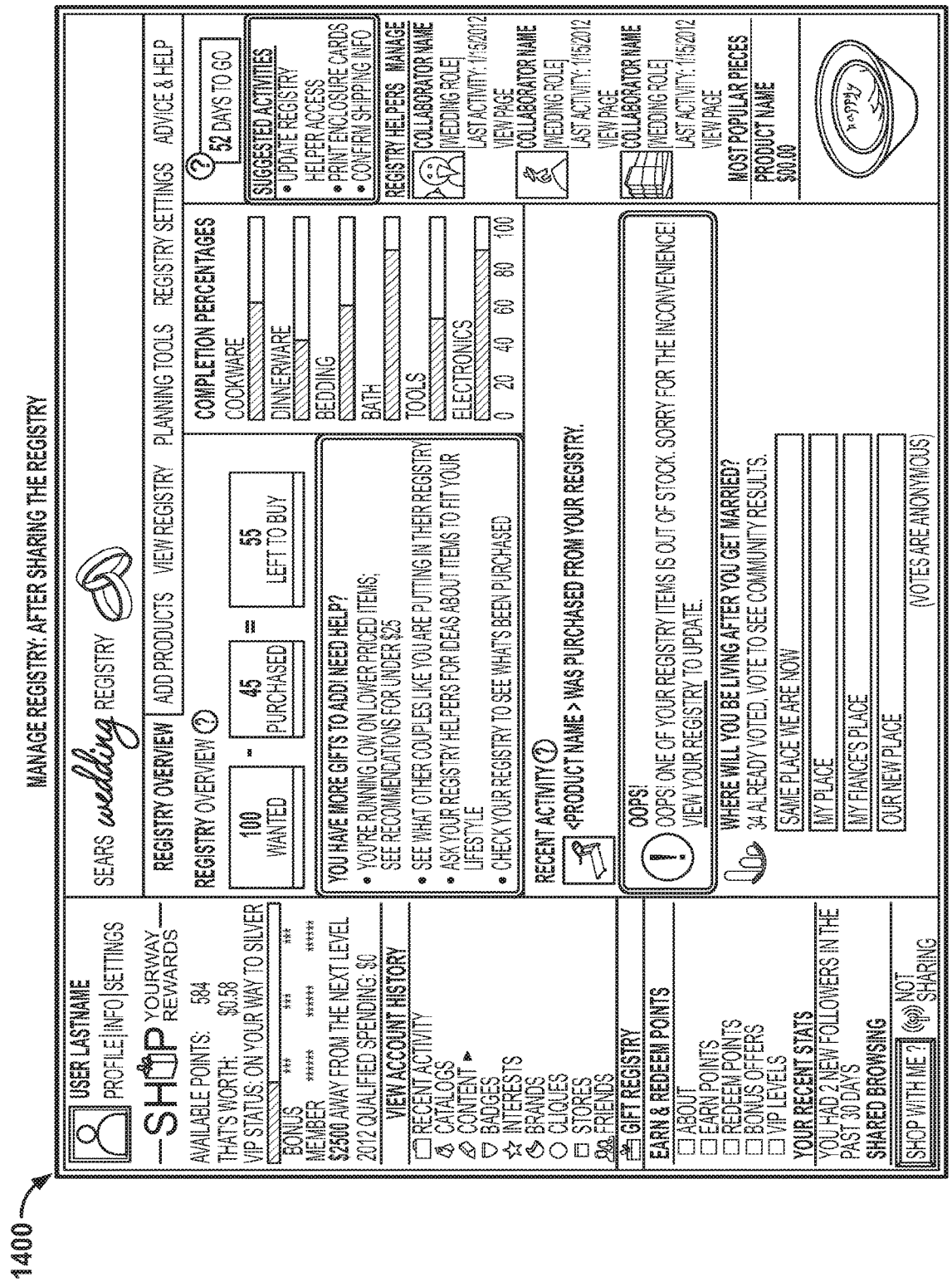
FIG. 14 is an illustration of an exemplary after-sharing web page, in accordance with a representative embodiment of the present invention.

FIG. 14 is an illustration of an exemplary after-sharing web page 1400, in accordance with a representative embodiment of the present invention.

FIG. 15 shows an illustration of an exemplary after-event web page 1500, in accordance with a representative embodiment of the present invention. As shown in FIG. 15, the after-event web page 1500 includes a promotion region 1510 offering purchasing options and incentives to the registrant/co-registrant to buy those items/products listed on the gift registry that have not been purchased for the registrant. In addition, the after-event web page 1500 includes an updated list of suggested activities 1520, appropriate for the period of time after the event (e.g., a wedding). The after-event web page 1500 also shows a news and activity feed 1580, which in the illustration of FIG. 15 has been updated with a message informing the registrant of a monetary discount being offered by a vendor or operator/sponsor of the gift registry. Such a message may be automatically generated by the gift registry system based on the information that all items/products listed on the gift registry by the registrant/co-registrant were not purchased for the couple by attendees and others.

Figure 16:
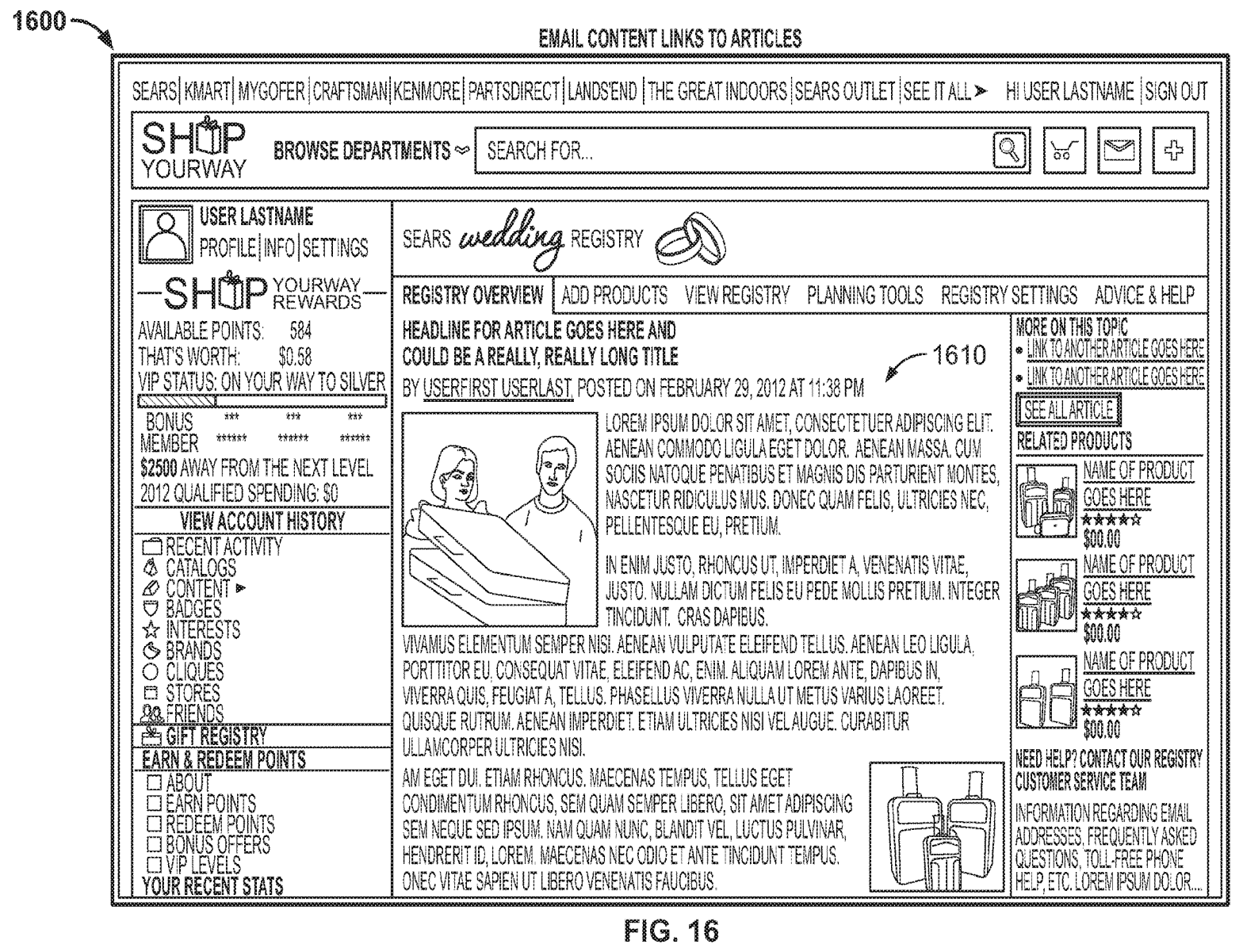

FIG. 16 is an illustration of a gift registry web page 1600 showing the display of an article 1610 containing news or information automatically selected by the gift registry system as being related to items/products from the gift registry of a registrant, or related to the life event of the registrant, in accordance with a representative embodiment of the present invention.

Figure 17:
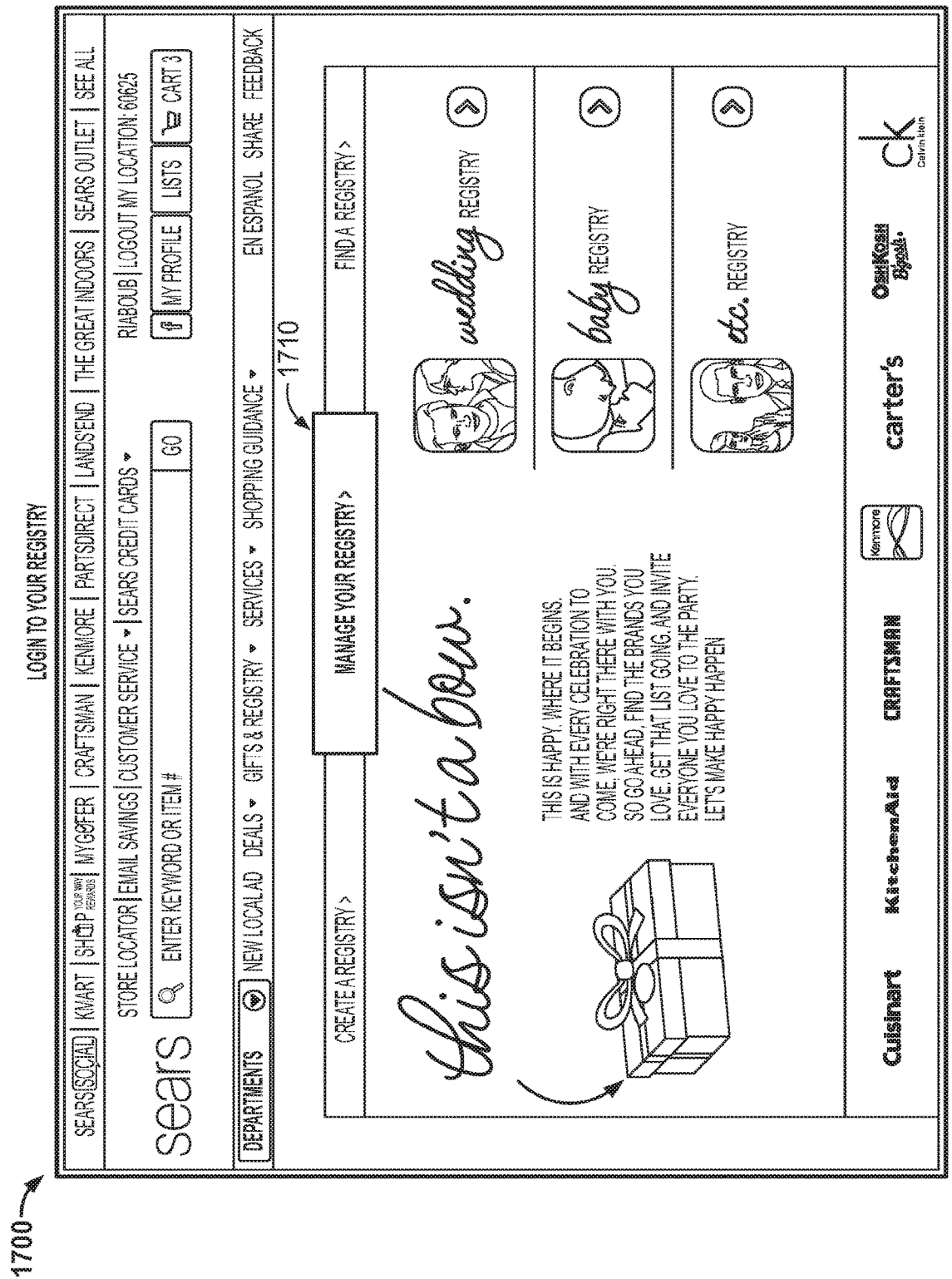
FIG. 17 shows an exemplary vendor or sponsor web page that provides options for a user to create, manage, or find a gift registry, in accordance with a representative embodiment of the present invention.

FIG. 17 shows an exemplary vendor or sponsor web page 1700 that provides options for a user to create, manage, or find a gift registry, in accordance with a representative embodiment of the present invention. The web page 1700 includes a gift registry management option 1710 to permit a user that has previously created a gift registry to make additions or changes to gift registry-related information.

Figure 18:
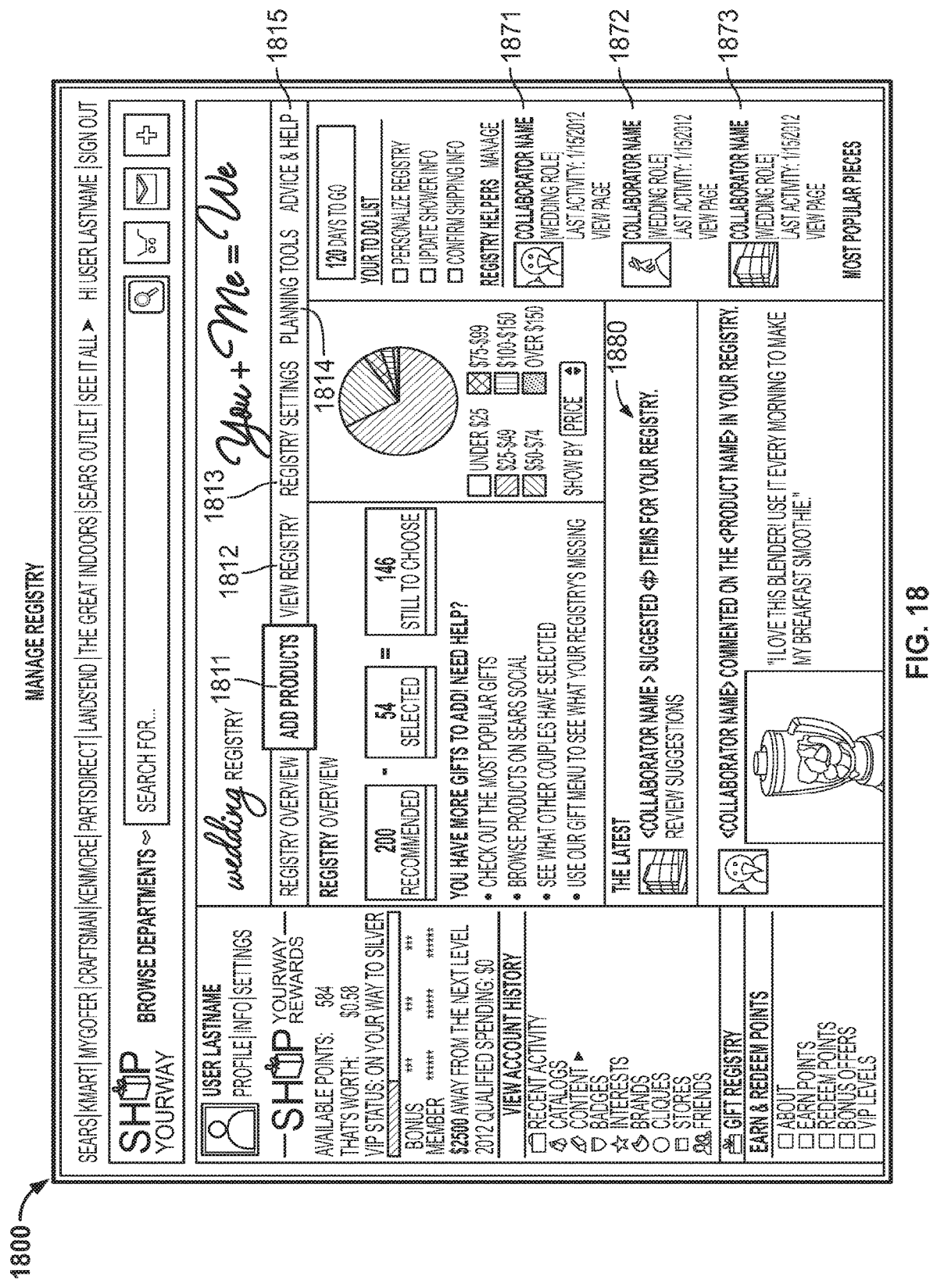

FIG. 18 illustrates an exemplary gift registry management web page 1800 that provides an option for adding registry items 1811, an option for viewing the items in the gift registry 1812, an option for modifying gift registry settings 1813, an option for planning for the life event 1814, and an option for requesting advice and help 1815, in accordance with a representative embodiment of the present invention. Among other features, the gift registry management web page 1800 also includes a news and activity feed 1880, previously described above, and an area displaying collaborators 1871, 1872, 1873 that are participating in the life event of the registrant in some fashion.

Figure 19:
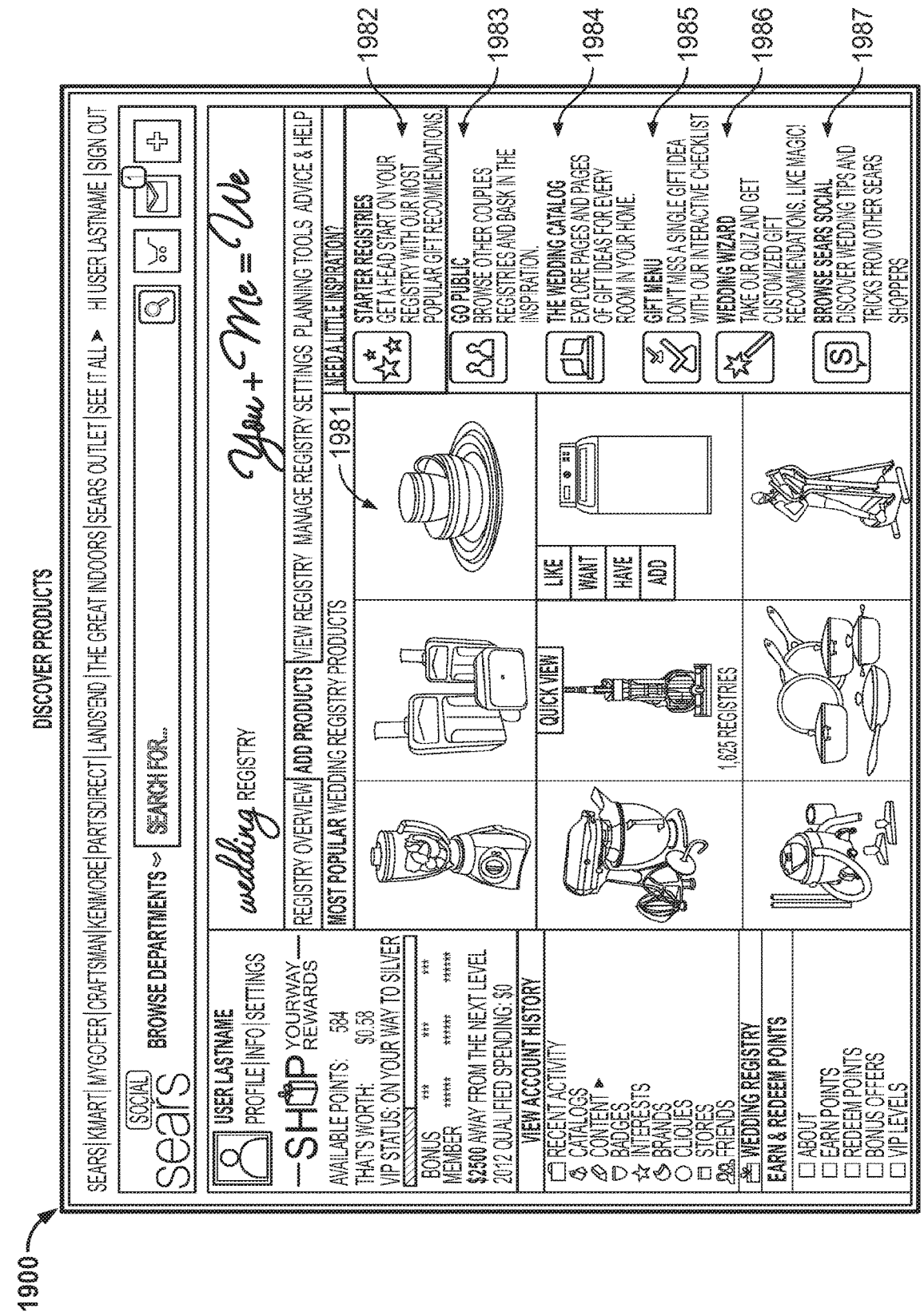
FIG. 19 shows an exemplary product discovery web page that may be displayed following user selection of the option for adding registry items of FIG. 18, in accordance with a representative embodiment of the present invention.

FIG. 19 shows an exemplary product discovery web page 1900 that may be displayed following user selection of the option for adding registry items 1811 of FIG. 18, in accordance with a representative embodiment of the present invention. As shown in FIG. 19, the registrant/co-registrant may select from a number of options, to aid them in selecting items for their gift registry including, for example, a starter registries option 1982 through which the registrant can initialize their own registry by selecting one of a number of sample registries listing items appropriate for their life event. The registrant/co-registrant may also select a go public option 1983, to permit the registrant to view the contents of registries of other registrant/co-registrants that have chosen to make their gift registries available for viewing. The registrant/co-registrant may also select a catalog option 1984, which permits the registrant to view a catalog of items/products that have been selected by the operator or sponsor of the gift registry, based upon the life event and personal information of the registrant/co-registrant. The registrant/co-registrant may also choose a gift menu option 1985 that provides a checklist containing ideas for review by the registrant/co-registrant, to insure that all possible gift ideas have been considered. In addition, the registrant/co-registrant may select a wedding wizard option 1986 which may employ, for example, artificial intelligence, machine learning, and data mining techniques to automatically provide gift suggestions to the registrant/co-registrant based upon their responses to a series of questions. In addition, in the example of FIG. 19, a portion of the exemplary product discovery web page 1900 is used for the display of the most popular products in the wedding registries of the operator or sponsor of the gift registry presenting the product discovery web page 1900, or other wedding registries supported or sponsored by a wider group of merchants, for example.

Figure 20:
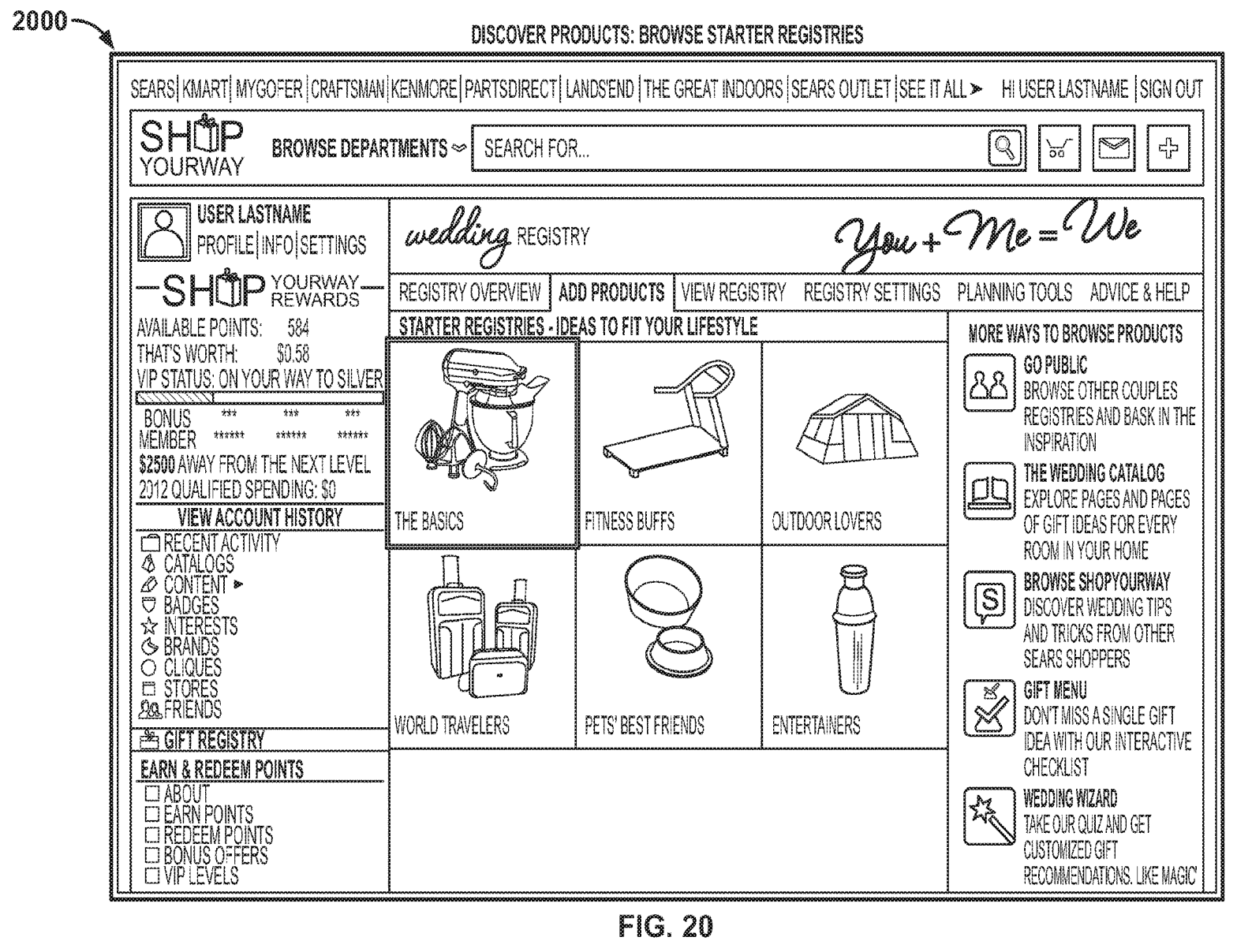

FIG. 20 shows an example starter registry web page 2000, in accordance with a representative embodiment of the present invention. As shown in FIG. 20, a representative embodiment of the present invention may offer a registrant/co-registrant a selection of example gift registries for their life event, each oriented or customized for the lifestyle of the registrant/co-registrant including for example, a starter gift registry that includes the basic needs and wants, a starter gift registry for couples that are fitness oriented, and a starter gift registry for those that enjoy entertaining, to name only a few example starter gift registries.

Figure 21:
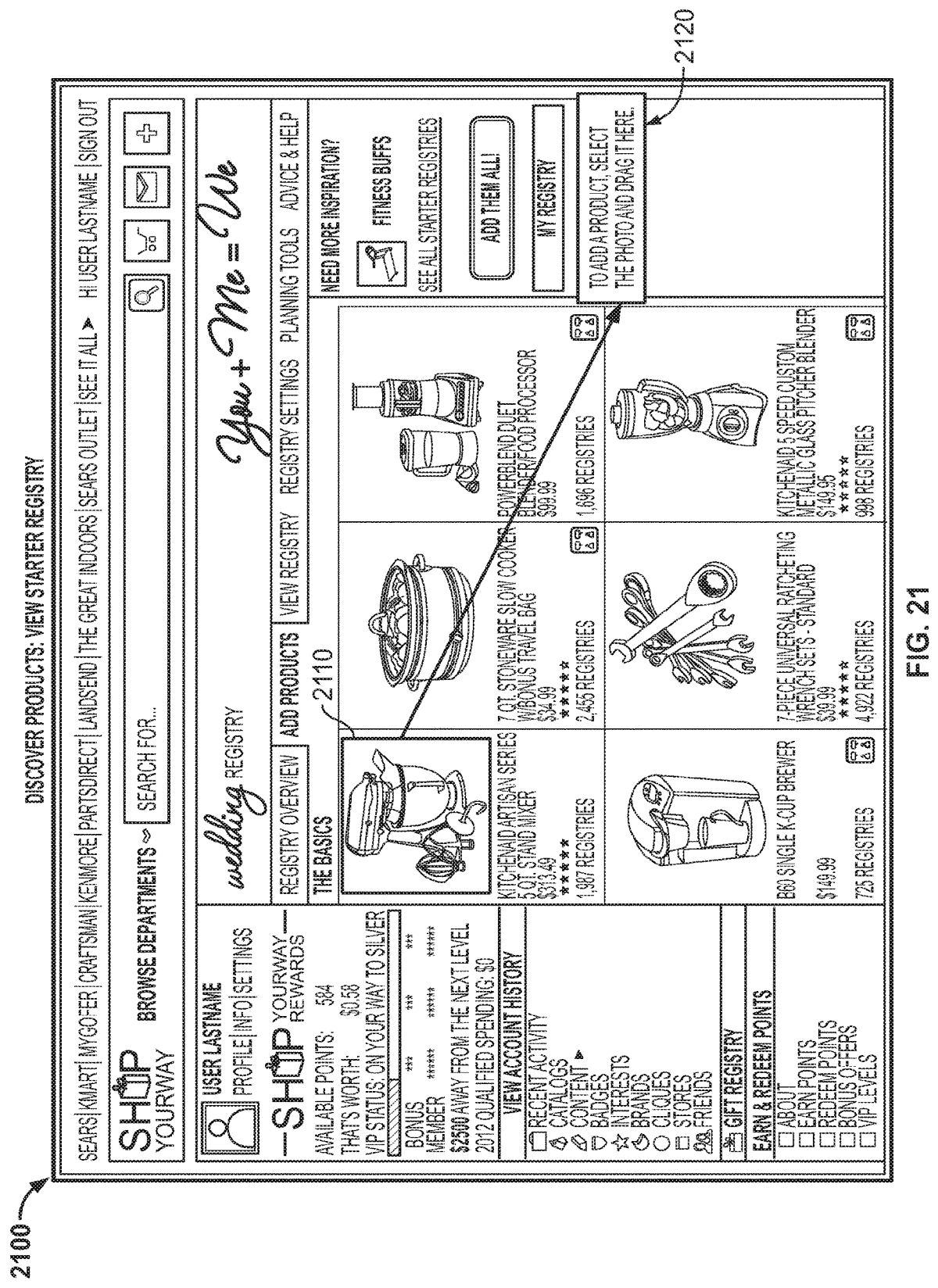

FIG. 21 illustrates an exemplary item selection web page 2100 that enables use of a picture drag-and-drop technique for use by a registrant/co-registrant in selecting items for assembling their own gift registry, in accordance with a representative embodiment of the present invention. In the example illustration of FIG. 21, the registrant/co-registrant has begun by selecting a "basic" starter registry, in which pictures of the items (e.g., a mixer 2110) are displayed for selection by the registrant/co-registrant. Once selected, the registrant/co-registrant may drag the selected item (e.g., the mixer 2110) to a "My Registry" area 2120 of the item selection web page 2100, which represents the gift registry of the registrant/co-registrant, to add the selected item to their gift registry. In some representative embodiments, the registrant/co-registrant(s) may add an item to a portion of the gift registry identified by the room in which the item goes. As items/products are added to the "My Registry" area 2120, information about the selected items/products such as, for example, a picture of the item, the price of the item, the stock keeping unit (SKU), the availability of the item, it's popularity, and scores from reviewers, to name just a few pieces of information, may be added to the gift registry, or saved for later addition to the gift registry for the registrant/co-registrant at the end of the item/product selection activity. In a representative embodiment of the present invention, the addition of an item to the gift registry may automatically be announced in the activity feed(s) for the registrant/co-registrant(s). This announcement may appear as a system generated message or "system story," and may be viewable by the registrant/co-registrant(s), collaborators, friends, and family, and other member of the personal network of the registrant/co-registrant(s), depending on corresponding permissions or privacy settings selected by the registrant/co-registrant(s).

Figure 22:
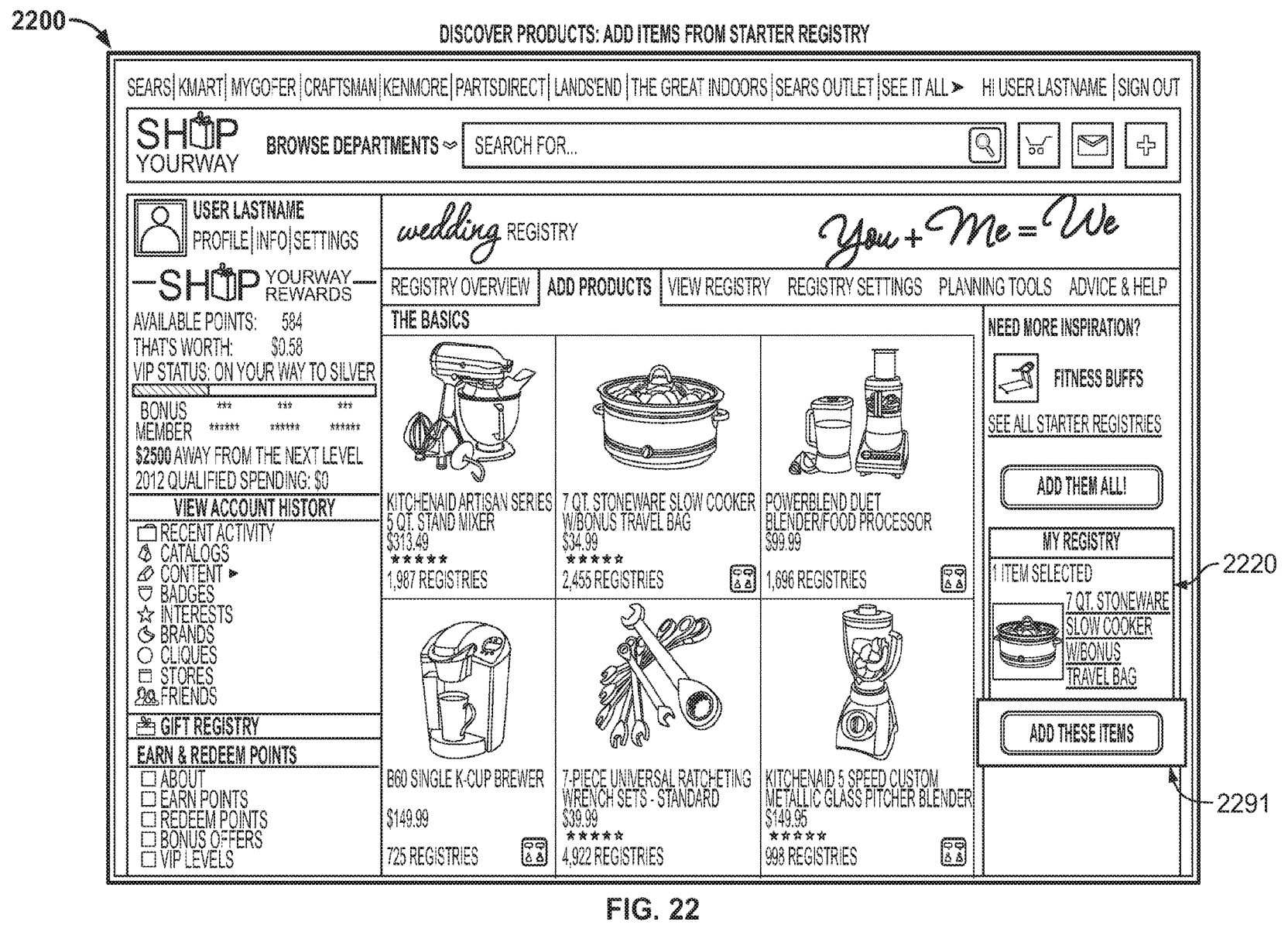

FIG. 22 shows an exemplary item selection web page 2200 that may correspond to the item selection web page 2100 of FIG. 21, following addition of an item/product to the "My Registry" area 2220, in accordance with a representative embodiment of the present invention. In the example FIG. 22, the registrant/co-registrant may select the "add these items" command button 2291 to add items/products collected in the "My Registry" area 2220 to the gift registry of the registrant/co-registrant.

Figure 23:
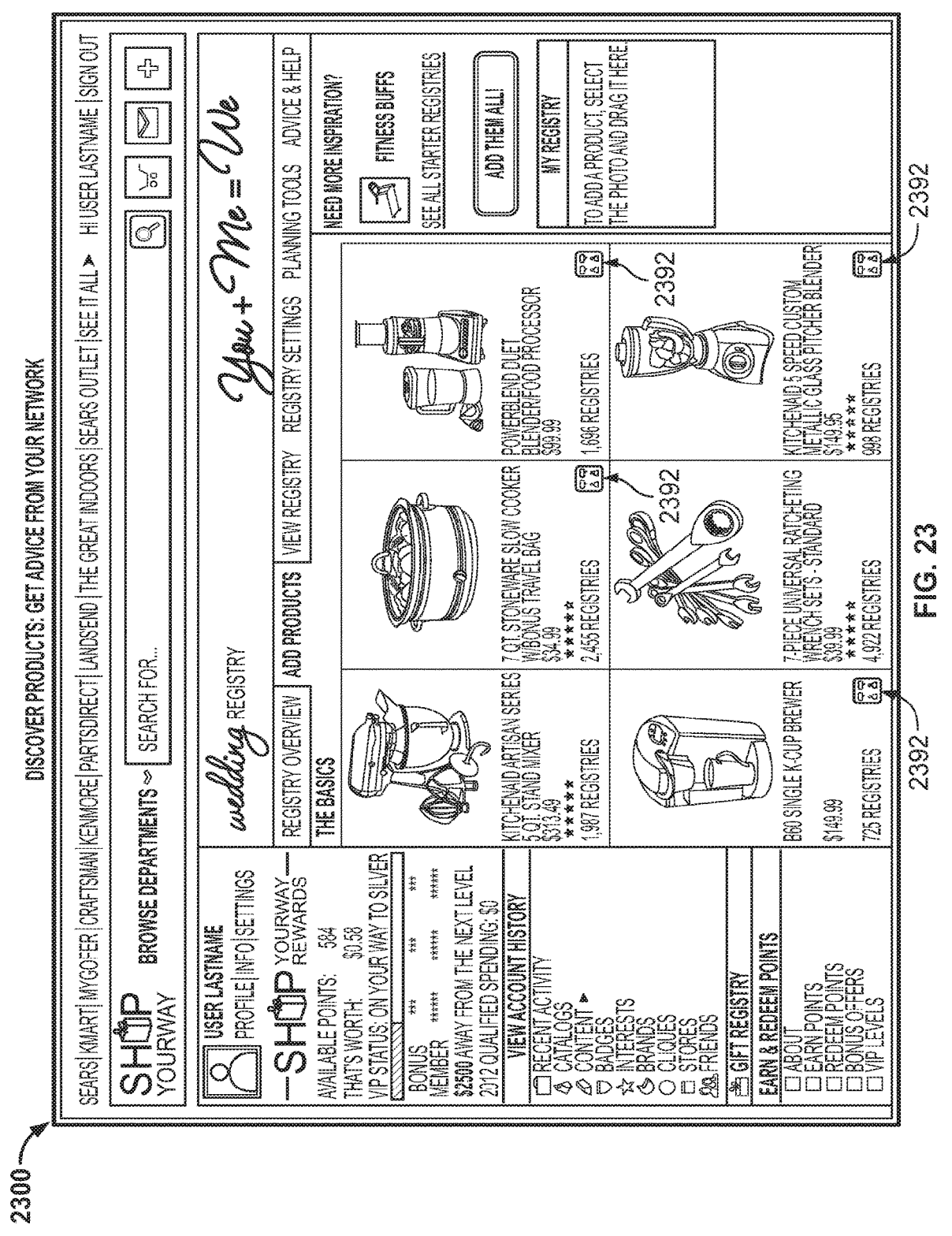

FIG. 23 is an illustration of an exemplary item selection web page 2300 that may, for example, correspond to the item selection web page 2200 of FIG. 22, in which four of the six items/products available for selection are accompanied by a "get advice" option 2392, in accordance with a representative embodiment of the present invention. The "get advice" option 2392 enables the registrant/co-registrant to request advice from others including, for example, those having specific expertise with the product such as professional product reviewers, writers for related media publications, and those individuals that own the product.

Figure 24:
FIG. 24 shows another exemplary item selection web page that may, for example, correspond to the item selection web page of FIG. 23, in which the registrant/co-registrant has chosen to get advice from individuals in his/her network (e.g., the co-registrant/registrant, collaborators, or others with whom the registrant/co-registrant communicates), in accordance with a representative embodiment of the present invention.

FIG. 24 shows another exemplary item selection web page 2400 that may, for example, correspond to the item selection web page 2300 of FIG. 23, in which the registrant/co-registrant has chosen to get advice from individuals in his/her network (e.g., the co-registrant/registrant, collaborators, or others with whom the registrant/co-registrant communicates), in accordance with a representative embodiment of the present invention. As shown in FIG. 24, the advice solicited by the registrant/co-registrant may, for example, come from compilations of "frequently asked questions (FAQs)", recommendations (e.g., from professionals or from those individuals known to the registrant/co-registrant), from polls, and from catalogs, to name only a few possible sources.

Figure 25:
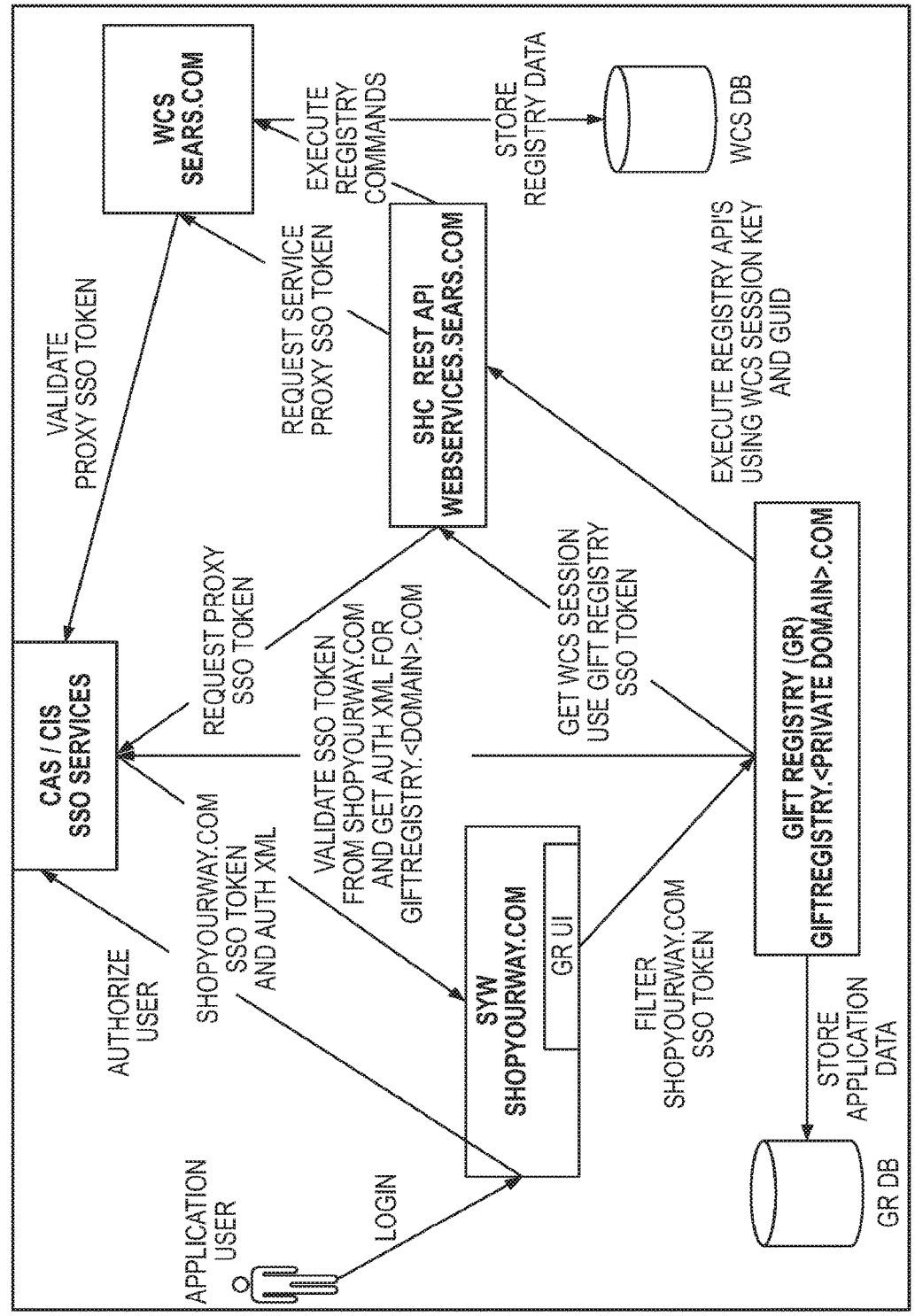
FIG. 25 illustrates an information flow in a system architecture of an exemplary user authentication mechanism for a gift registry, in accordance with a representative embodiment of the present invention.

FIG. 25 illustrates an information flow in a system architecture 2500 of an exemplary user authentication mechanism for a gift registry, in accordance with a representative embodiment of the present invention.

Figure 26:
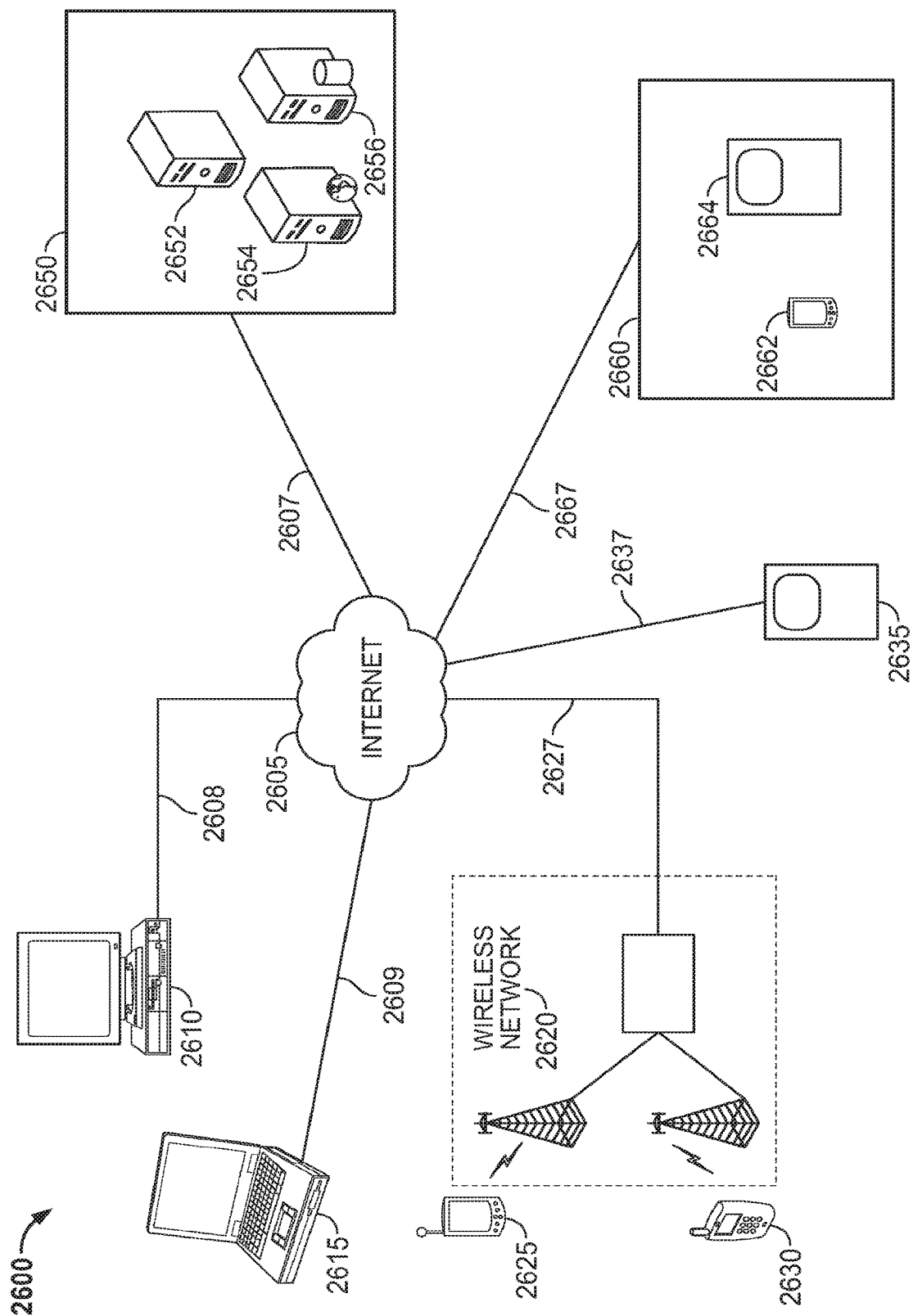
FIG. 26 is a block diagram of an exemplary system in which a representative embodiment of the present invention may be practiced.

FIG. 26 is a block diagram of an exemplary system 2600 on which a representative embodiment of the present invention may be practiced. As illustrated in FIG. 26, the system 2600 includes an e-commerce platform 2650 comprising one or more web servers 2654, one or more database servers 2656, and one or more application servers 2652. The elements of the e-commerce platform 2650 may be interconnected, and may singly or as a group be connected to Internet 2605 via communication link 2607, which may employ any suitable combination of wired or wireless data communication links. FIG. 26 also includes personal computers (PCs) 2610, 2615, which are connected to the Internet 2605 by communications links 2608, 2609, respectively, which may be any suitable combination of wired or wireless data communication links. PCs 2610, 2615 may be any of, for example, a desktop computer, a laptop computer, a notebook computer, a netbook computer, a tablet computer, or any other electronic device having capabilities suitable for accessing the Internet 2605 from, for example, a home, a small business, or any private or public area having suitable support for communications links 2608, 2609.

In addition, FIG. 26 illustrates a user communication device 2625 that may comprise, for example, a tablet computer, smart phone, or other handheld electronic device capable of communicating with the e-commerce platform 2650 via a wireless network 2620, a communication link 2627, and the Internet 2605. The communication device 2625 of FIG. 26 may include suitable software applications, hardware, and logic to permit the communication device 2625 to display received web pages and other forms of digital information on a display of the communication device 2625, and suitable user interface (UI) elements to permit a user to interact with the e-commerce platform 2650 using tactual, speech, and other forms of input. The communication device 2625 may be capable of having native applications installed on the communication device from repositories accessible as "app stores," for example. The wireless network 2620 may support communication of digital information using any suitable wireless access technology including, for example, any combination of short-range, long range, Wi-Fi, cellular, personal communication system (PCS), Bluetooth, Near Field communication (NFC), to name only a few possible air interface technologies.

FIG. 26 also includes a portable telephone that may be capable of communicating over one or more of a cellular, PCS, Wi-Fi, or other wireless communication network, and may have more limited yet sufficient functionality to interact with the e-commerce platform 2650 than that available from the PCs 2610, 2615 and the communication device 2625.

In addition, FIG. 26 illustrates a kiosk device 2635, which may permit users in retail and public venues to access the e-commerce platform 2650. The kiosk device 2635 may be designed for indoor or outdoor use, and may be linked to the e-commerce platform 2650 via a communication link 2637 and Internet 2605, as shown, or may communicate directly with the e-commerce platform 2650 using any other suitable wired or wireless means. The kiosk 2635 may have functionality that is equivalent, greater than, or less than the personal computers 2610, 2615, the communications device 2625, and the cellular telephone 2630.

The illustration of FIG. 26 also shows a retail establishment 2660 that may, for example, be a "brick-and-mortar" business associated with the operator or sponsor of the e-commerce platform 2650. The retail establishment 2660 may include a kiosk 2664 that may support access to the e-commerce platform 2650 from the retail establishment 2660, for those users that are located within the retail establishment 2660. The illustration of FIG. 26 also includes a communication device 2662 that may belong to, or be loaned to a customer of the retail establishment 2660, permitting the customer to, for example, electronically access information about products and/or services available at the retail establishment 2660, at other business locations of the operator of the retail establishment 2660, or at other businesses operated by, for example, the operator, or businesses that partner with the operator of the e-commerce platform 2650. Communication devices within the retail business 2660 such as, for example, the communication device 2662 and the kiosk 2664 may communicate with the e-commerce platform 2650 via the Internet 2605 and the communication link 2667, which may be, for example, any suitable combination of wired and/or wireless communication technologies.

In addition, the system 2600 of FIG. 26 includes an application/web server 2670 that may, for example, be operated by a third-party provider of applications selectable by users of the e-commerce platform 2650, and that may be arranged to interact with elements of the e-commerce platform 2650, as described more fully below.

In accordance with a representative embodiment of the present invention, the elements of a system such as the e-commerce platform 2650 of FIG. 26, for example, may include the functionality in a software application that enables user membership in a loyalty program of a business operator or sponsor of the e-commerce platform 2650, and the engagement of users in various events and the activities. The e-commerce platform 2650 may include a software platform which tracks social interactions of users, and may track the activities of each member of the loyalty program. The tracking capabilities may include a flexible interaction tracking framework that supports multiple social interactions of the members. In addition, the software application may support interfacing a variety of user communication devices including, for example, tablet, desktop, notebook, notepad, and network computers, cellular telephone and smart phones, public and private kiosks, and other suitable electronic user communication devices available at the present time or in the future.

Figure 27:
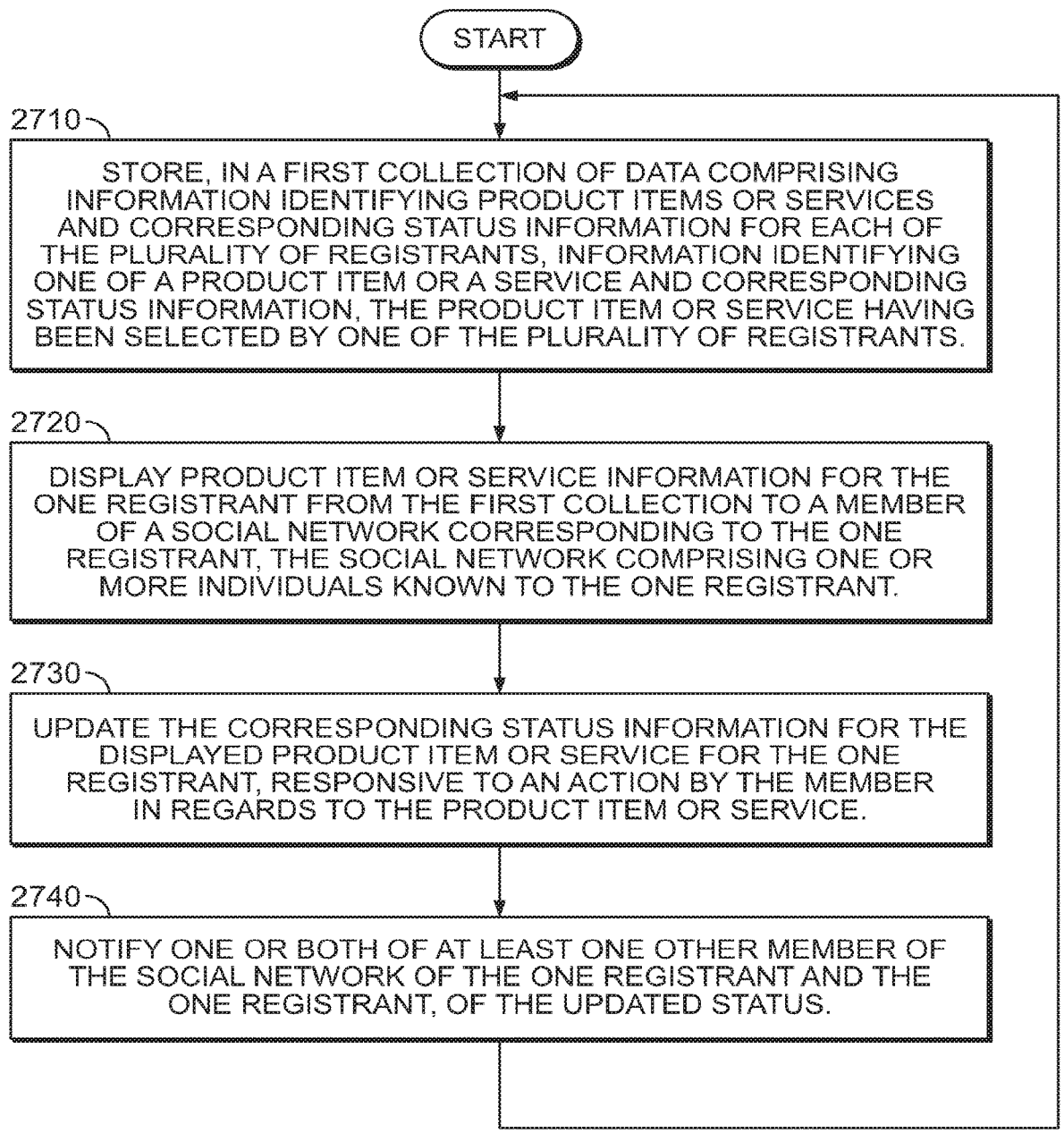
FIG. 27 shows a flowchart illustrating an exemplary method of operating a gift registry, in accordance with a representative embodiment of the present invention.

FIG. 27 shows a flowchart illustrating an exemplary method of operating a gift registry, in accordance with a representative embodiment of the present invention. The following discussion may make reference to the elements of the system of FIG. 26, in which a representative embodiment of the present invention may be practiced. The method begins at block 2710, in which the system of FIG. 26 may store, in a first collection of data comprising information identifying product items or services and corresponding status information for each of the plurality of registrants, information identifying one of a product item or a service and corresponding status information, the product item or service having been selected by one of the plurality of registrants. For example, such a collection of data may be stored in the database servers 2656 of the e-commerce platform 2650, and a registrant may select product items or services using any of the PCs 2610, 2615, the user communication device 2625, the portable telephone 2630, the communication device 2662, or the kiosks 2635, 2664 of FIG. 26.

Next, at block 2720, the method of FIG. 27 may display product item or service information for the registrant from the first collection to a member of a social network corresponding to the one registrant, the social network comprising one or more individuals known to the one registrant. The information from the collection of product items and services for the registrant may be displayed to the member of the social network of the registrant using any of the devices communicatively coupled to the e-commerce platform such as, for example, the PCs 2610, 2615, the user communication device 2625, the portable telephone 2630, the communication device 2662, or the kiosks 2635, 2664 of FIG. 26.

Next, the method of FIG. 27 may, at block 2730, update the corresponding status information for the displayed product item or service for the one registrant, responsive to an action by the member with respect to the product item or service. For example, the member of the social network of the registrant may choose to purchase the displayed product item for the registrant, or may choose to post one or more comments about the product item or service displayed to the member of the social network, and the method of FIG. 27 may update the status for the displayed product item or service to reflect that action by the member. The method of FIG. 27 may then, at block 2740, notify one or both of the one registrant and at least one other member of the social network of the one registrant, of the updated status. In this manner, a system supporting a gift registry in accordance with a representative embodiment of the present invention, such as the e-commerce platform 2650 of FIG. 26, may notify members of the social network of a registrant of various actions taken by other members of the social network and the registrant(s), in order to better engage them in the various activities surrounding the life event of the registrant(s). The method illustrated in FIG. 27 then loops back, to support further actions by the registrant and members of the social network of the registrant.

It should be noted that although the example method of FIG. 27 relates to a method of operating a gift registry, such as that suitable for a wedding, anniversary, shower, or other gift giving event, this example is provided for illustrative purposes only, as the concepts disclosed herein may be applied to the operation of other systems, information, and actions related to e-commerce and event planning activities of other individuals and their social networks, without departing from the spirit and scope of the present invention.

Various representative embodiments may enable a registrant to manage a registry or communicate with event participants online, via the Internet, or using a kiosk or other system available in a retail environment. Some representative embodiments of the present invention may, in addition or as an alternative, support management of a registry or communicate with various participants via, for example, an application or "app" for a smart phone device such as one of the iPhone products from Apple Inc., or any smart device based upon, for example, the Android platform, developed by Google. Access using such devices may, for example, allow the registrant/co-registrant(s), or others to add or delete items/products from the gift registry. Access using mobile devices such as those mentioned above may provide content customized for the particular device or communication path used for access, and may in some cases present a subset of the content or functionality available via online or Internet access using, for example, a personal, notebook, netbook, or ultrabook computer having greater computing and/or display capability. Some representative embodiments may enable registrants to create their gift registries or wish lists on their mobile devices, and may provide a user experience on the mobile device that is equivalent or consistent with that available via an online or Internet communication link, such that anything they are able to do online, can also be done using their mobile device. A representative embodiment of the present invention may support communication (e.g., text "chat" or other forms of communication between or among the registrant, the co-registrant, and others (e.g., friends, family, gift givers, and planners/coordinators) while in a store together, or while shopping at various locations. For example, a bride and groom may be in different parts of a store, or at different locations, and may communicate via a representative embodiment of the present invention to share or discuss items that they are looking at, to make decisions about what to include in their social gift registry.

In addition, a representative embodiment of the present invention may include location-specific services to users of mobile devices. For example, a user of a mobile device may be notified via their mobile device when visiting a merchant that they are currently located in the store near an item that is listed in their gift registry, and may then be offered a promotion in-store to encourage purchase of such an item.

A representative embodiment of the present invention may also make use of the functionality and information streams generated by popular retail applications ("apps") such as, for example, the mobile application known as Shopkick™, developed by shopkick, Inc. The Shopkick™ app provides consumers with rewards and offers simply for walking into stores, for scanning products, and for signing up their friends. A representative embodiment of the present invention may select the rewards, coupons, discounts, and offers provided to registrants, co-registrant(s), collaborators and others based upon, for example, the contents of a gift registry, the location and behavior of the registrant, co-registrant(s), and collaborators, and information provided by systems supporting retail apps such as Shopkick™.

A representative embodiment of the present invention may take into account a registrant's location, the registrant's behavior, and the behavior of the registrant's network (e.g., the behavior of the registrant, the co-registrant(s), the collaboratories, and others associated with the registrant), in creating promotions, coupons, and discounts.

As previously discussed, aspects of the social gift registry described above may also be seen in a "social wish list" for events such as, for example, birthdays and holidays. Some features described above with respect to a "social gift registry" may also apply to a "social wish list," while others may not, but the general concept of system(s) and method(s) that enable individuals to, for example, engage in social networking in the planning of an event that involves the selection and giving of gifts, and the execution of the various tasks and activities that may be involved.

It should again be noted that although much of the discussion above describes the features and operation of a "social gift registry," and similarly a "social wish list," in ways that may be interpreted to apply to access via a web site using an Internet browser on a personal computer (PC), representative embodiments of the present invention are not necessarily limited in that regard, unless explicitly claimed. The various access and communication aspects of representative embodiments of the present invention may involve the use not only of Internet access using a PC, but may also be enabled using other devices such as, for example, various combinations of PCs, mobile devices such as "smart phones," public and private kiosks, set top boxes, interactive game systems, and other suitable electronic devices connected via any suitable wireless and/or wired communication means such as, for example, telephone, Internet, and/or cable television infrastructures.

Aspects of the present invention may be seen in a system for operating a gift registry for registering gift preferences of a plurality of registrants. Such a system may comprise a first collection of data comprising for each of the plurality of registrants, information identifying one or more of a product item or a service and corresponding status information for each product item or service, and a second collection of data comprising information characteristic of each of the plurality of registrants. The system may also comprise a third collection of data comprising information identifying members of each of a plurality of social networks, where each social network corresponds to one of the plurality of registrants and comprises one or more individuals known to the one registrant. The system may comprise at least one processor having access to the first collection, the second collection, and the third collection, and the at least one processor may be operable to, at least, store, in the first collection, information identifying one of a product item or a service selected by the one registrant, and may display product item or service information for the one registrant from the first collection to a member of the corresponding social network.

In such a system, the at least one processor may also be operable to update the corresponding status information for the displayed product item or service for the one registrant, responsive to an action by the member with respect to the product item or service, and to notify one or both of the one registrant and at least one other member of the social network of the one registrant, of the updated status. In a representative embodiment of the present invention, the status information may comprise an indication of a quantity, and may comprise an indication of purchase of the corresponding product item or service for the one registrant. The membership in the social network, notification, member access to information in the first collection, and an ability of a member to add a product item or a service to the first collection may be controlled by the one registrant.

In a representative embodiment of the present invention, the at least one processor may be operable to, at least, automatically send one or more messages to one or both of the one registrant and members of the corresponding social network, and at least one date of sending and content of the one or more messages may be determined based upon a type of social event and associated event date specified by the one registrant. The at least one processor may also be operable to, at least, communicate, to the one registrant, when an out of stock condition has occurred for a product item identified for the one registrant in the first collection, and communicate, to the one registrant, when a product item identified for the one registrant is available from a vendor at a reduced cost. The at least one processor may be operable to, at least, enable communication among the one registrant and members of the corresponding social network. The communication among the one registrant and members of the corresponding social network may be merged to produce a feed viewable by one or both of the at least one registrant and the members of the social network.

In some representative embodiments of the present invention, the at least one processor may be operable to, at least, responsive to the one registrant, populate the first collection for the one registrant with one or both of product items or services of a gift registry created by someone other than the one registrant, prompt the one registrant to enable or disable one or more permissions regarding member access to the first collection and notifications, and store the one or more permissions for the one registrant in the second collection. The action by the member with respect to the product item or service may comprise purchasing the product item or service, and may comprise posting a comment about the product item or service.

Further aspects of the present invention may be seen in a method of operating a gift registry for registering gift preferences of a plurality of registrants. Such a method may comprise storing, in a first collection of data comprising information identifying product items or services and corresponding status information for each of the plurality of registrants, information identifying one of a product item or a service and corresponding status information, the product item or service having been selected by one of the plurality of registrants. The method may also comprise displaying product item or service information for the one registrant from the first collection to a member of a social network corresponding to the one registrant, the social network comprising one or more individuals known to the one registrant. The method may further comprise updating the corresponding status information for the displayed product item or service for the one registrant, responsive to an action by the member with respect to the product item or service. Such a method may, in addition, comprise notifying one or both of the one registrant and at least one other member of the social network of the one registrant, of the updated status.

In a representative embodiment of the present invention, the status information may comprise an indication of a quantity, and may comprise an indication of purchase of the corresponding product item or service for the one registrant. In such an embodiment, the membership in the social network, notification, member access to information in the first collection, and an ability of a member to add a product item or a service to the first collection may be controlled by the one registrant.

A method in accordance with a representative embodiment of the present invention may comprise automatically sending one or more messages to one or both of the one registrant and members of the corresponding social network, and at least one date of sending and content of the one or more messages may be determined based upon a type of social event and associated event date specified by the one registrant. In some representative embodiments, such a method may comprise communicating, to the one registrant, when an out of stock condition has occurred for a product item identified for the one registrant in the first collection, and may comprise communicating, to the one registrant, when a product item identified for the one registrant is available from a vendor at a reduced cost. The method may comprise enabling communication among the one registrant and members of the corresponding social network. The communication among the one registrant and members of the corresponding social network may be merged to produce a feed viewable by one or both of the at least one registrant and the members of the social network.

In various representative embodiments, such a method may also comprise, responsive to the one registrant, populating the first collection for the one registrant with one or both of product items or services of a gift registry created by someone other than the one registrant. In addition, the method may comprise prompting the one registrant to enable or disable one or more permissions regarding member access to the first collection and notifications, and storing the one or more permissions for the one registrant. The action by the member with respect to the product item or service may comprise purchasing the product item or service, and may comprise posting a comment about the product item or service.

Yet additional aspects of a representative embodiment of the present invention may be found in a non-transitory computer-readable medium comprising one or more code sections, each code section having stored therein one or more instructions executable by a processor to cause the processor to perform the method of operating a gift registry such as that described above.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for operating a gift registry for registering gift preferences of a plurality of registrants, the system comprising:
    a first collection of data comprising for each of the plurality of registrants, information identifying one or more of a product item or a service and corresponding status information for each product item or service;
    a second collection of data comprising information characteristic of each of the plurality of registrants;
    a third collection of data comprising information identifying members of each of a plurality of social networks, each social network corresponding to one of the plurality of registrants and comprising one or more individuals known to the one registrant;
    at least one processor having access to the first collection, the second collection, and the third collection, the at least one processor operable to, at least:
    provide single sign on (SSO) authentication at a website of an e-commerce company;
    send an SSO token to an authentication service for SSO authentication, wherein the authentication service is in communication with a website of the e-commerce company and a website of the gift registry;
    in response to the SSO authentication, filter the SSO token and send the filtered SSO token to the website of the gift registry;
    validate, via the web site of the gift registry and the authentication service, the filtered SSO token from the website of the e-commerce company;
    store, in the first collection, information identifying one of a product item or a service selected by the one registrant;
    display product item or service information for the one registrant from the first collection to a member of the corresponding social network;
    update the corresponding status information for the displayed product item or service for the one registrant, responsive to an action by the member with respect to the product item or service; and
    notify one or both of the one registrant and at least one other member of the social network of the one registrant, of the updated status.

2. The system according to claim 1, wherein the status information comprises an indication of a quantity.

3. The system according to claim 1, wherein the status information comprises an indication of purchase of the corresponding product item or service for the one registrant.

4. The system according to claim 1, wherein membership in the social network is controlled by the one registrant.

5. The system according to claim 1, wherein notification is controlled by the one registrant.

6. The system according to claim 1, wherein member access to information in the first collection is controlled by the one registrant.

7. The system according to claim 1, wherein an ability of a member to add a product item or a service to the first collection is controlled by the one registrant.

8. The system according to claim 1, wherein the at least one processor is operable to, at least:
automatically send one or more messages to one or both of the one registrant and members of the corresponding social network, wherein at least one date of sending and content of the one or more messages is determined based upon a type of social event and associated event date specified by the one registrant.

9. The system according to claim 1, wherein the at least one processor is operable to, at least:
communicate, to the one registrant, when an out of stock condition has occurred for a product item identified for the one registrant in the first collection.

10. The system according to claim 1, wherein the at least one processor is operable to, at least:
communicate, to the one registrant, when a product item identified for the one registrant is available from a vendor at a reduced cost.

11. The system according to claim 1, wherein the at least one processor is operable to, at least:
enable communication among the one registrant and members of the corresponding social network.

12. The system according to claim 11, wherein the communication among the one registrant and members of the corresponding social network is merged to produce a feed viewable by one or both of the at least one registrant and the members of the social network.

13. The system according to claim 1, wherein the at least one processor is operable to, at least:
responsive to the one registrant, populate the first collection for the one registrant with one or both of product items or services of a gift registry created by someone other than the one registrant.

14. The system according to claim 1, wherein the at least one processor is operable to, at least:
prompt the one registrant to enable or disable one or more permissions regarding member access to the first collection and notifications; and
store the one or more permissions for the one registrant in the second collection.

15. The system according to claim 1, wherein the action by the member with respect to the product item or service comprises purchasing the product item or service.

16. The system according to claim 1, wherein the action by the member with respect to the product item or service comprises posting a comment about the product item or service.

17. A method of operating a gift registry for registering gift preferences of a plurality of registrants, the method comprising:
providing single sign on (SSO) authentication at a website of an e-commerce company;
sending an SSO token to an authentication service for SSO authentication, wherein the authentication service is in communication with a website of the e-commerce company and a website of the gift registry;
in response to the SSO authentication, filtering the SSO token and send the filtered SSO token to the website of the gift registry;
validating, via the website of the gift registry and the authentication service, the filtered SSO token from the website of the e-commerce company;
storing, in a first collection of data comprising information identifying product items or services and corresponding status information for each of the plurality of registrants, information identifying a product item or a service and corresponding status information, the product item or service having been selected by one of the plurality of registrants;
displaying product item or service information for the one registrant from the first collection to a member of a social network corresponding to the one registrant, the social network comprising one or more individuals known to the one registrant;
updating the corresponding status information for the displayed product item or service for the one registrant, responsive to an action by the member with respect to the product item or service; and
notifying one or both of the one registrant and at least one other member of the social network of the one registrant, of the updated status.

18. The method according to claim 17, wherein the status information comprises an indication of a quantity.

19. The method according to claim 17, wherein the status information comprises an indication of purchase of the corresponding product item or service for the one registrant.

20. The method according to claim 17, wherein membership in the social network is controlled by the one registrant.

* * * * *